(12) United States Patent
Luo et al.

(10) Patent No.: US 11,976,418 B2
(45) Date of Patent: May 7, 2024

(54) STARCH FIXATION AND RETENTION IN RECYCLED FIBER SYSTEMS

(71) Applicant: KEMIRA OYJ, Helsinki (FI)

(72) Inventors: Yuping Luo, Atlanta, GA (US); Jennifer Riser, Atlanta, GA (US)

(73) Assignee: KEMIRA OYJ, Helsinki (FI)

( * ) Notice: Subject to any disclaimer, the term of this patent is extended or adjusted under 35 U.S.C. 154(b) by 59 days.

(21) Appl. No.: 17/498,818

(22) Filed: Oct. 12, 2021

(65) Prior Publication Data

US 2023/0116374 A1    Apr. 13, 2023

(51) Int. Cl.
*D21C 5/02*    (2006.01)
*D21H 11/14*    (2006.01)

(52) U.S. Cl.
CPC ............. *D21C 5/022* (2013.01); *D21H 11/14* (2013.01)

(58) Field of Classification Search
CPC ................................ D21C 5/022; D21H 11/14
See application file for complete search history.

(56) References Cited

U.S. PATENT DOCUMENTS

| | | | |
|---|---|---|---|
| 6,117,938 A | 9/2000 | Farinato et al. | |
| 6,592,718 B1 | 7/2003 | Wong Shing et al. | |
| 2003/0150575 A1* | 8/2003 | Hund | D21H 21/10 |
| | | | 162/158 |
| 2009/0027759 A1 | 11/2009 | Hund et al. | |
| 2014/0110073 A1* | 4/2014 | Karppi | D21H 17/72 |
| | | | 162/164.3 |
| 2015/0041092 A1* | 2/2015 | Hietaniemi | D21H 17/55 |
| | | | 162/168.3 |
| 2019/0024306 A1* | 1/2019 | Hietaniemi | D21C 5/005 |

FOREIGN PATENT DOCUMENTS

| | | |
|---|---|---|
| CN | 109957066 | 7/2019 |
| EP | 0 730 618 | 12/1999 |
| WO | 2000/034582 | 6/2000 |
| WO | 2016/079383 | 5/2016 |
| WO | 2021/001602 | 1/2021 |

* cited by examiner

*Primary Examiner* — Eric Hug
*Assistant Examiner* — Matthew M Eslami
(74) *Attorney, Agent, or Firm* — Robin L. Teskin; Baker, Donelson, Bearman, Caldwell & Berkowitz PC

(57) ABSTRACT

The present invention provides a novel method and composition for enhancing the efficiency of starch adsorption (i.e., starch trapping) from starch-containing furnishes comprising high content of recycled fibers for use in paper making processes such as pulp, paper, or board production. A novel polymer coagulation system is disclosed in which two quick inversion cationic emulsion polymers (starch trapping polymers A and B) are co-mixed at optimal blend ratios to meet specific recycled fiber and process water requirements for different recycled fiber plants and added to furnishes prior to formation of paper or board in a paper machine. Co-mixed solutions of starch trapping polymers A and B provide synergistic enhancements in (i) starch trapping efficiency and (ii) starch retention in the produced paper or board over equivalent dosage levels of singly administered polymer A, polymer B, or conventional starch trapping products, without over-flocculation or formation of stickies.

13 Claims, 9 Drawing Sheets

STARCH FIXATION AND RETENTION IN RECYCLED FIBER SYSTEMS

FIELD OF THE INVENTION

The present invention generally relates to a method for treating starch-containing recycled fiber stock, mill broke fibers, and/or starch-containing process water for improved starch retention in pulp, paper, or board production. Also, the invention relates to a composition comprising co-mixed quick inversion cationic emulsion starch trapping polymers for effecting such methods.

BACKGROUND OF THE INVENTION

Recycled fiber material, such as old corrugated containerboard (OCC), is commonly used as raw material for paper or board. The recycled fiber material comprises a number of other substances in addition to the fibers. During production of paper or board, particulate foreign material is separated from the pulp in the pulper or at the screening. Some substances are naturally retained on the fibers and do not disturb the process. Other substances, such as stickier, may be separated from the pulp at the screening and at least partly removed from the process.

Typically, recycled fiber material comprises starch, which has low molecular weight (LMW). This starch originates from the surface sizing of the paper or board, and it retains poorly on the fibers as it typically uncharged or has slightly anionic charge. Due to its small size it is not effectively separated at the screening either. Thus, the LMW starch remains in the water circulation of the pulping and papermaking processes or it is removed together with the screen effluent to the wastewater treatment. In circulating process water, the starch increases the risk for microbial growth, as it is suitable nutritive substance for various microbes. Microbes may affect both the functioning of the chemistry of papermaking and/or the quality of the end product. High microbial activity can lower the pH and have a marked effect on wet-end chemistry. High microbial activity can also create strong odors that may be a nuisance or even a danger to operating personnel and may also be destructive for product quality in packaging grades. Formation of slime and biofilms on the surfaces of tanks and machine frames leads to paper defects, such as spots and holes, or web breaks when slime lumps slough off. Adsorption, trapping, or fixation of starch, for example by starch trapping polymers, is necessary to prevent such microbial processes from occurring.

The amount of LMW starch in the recycled fiber material may be relatively high, for example 1-3% of the total weight of the recycled fiber. When the starch is lost to the water circulation during pulp preparation processes the overall yield of the process is naturally decreased. Therefore, novel compositions and methods for preventing starch enrichment to the water circulation and assisting its retention to the recycled fibers will potentially provide numerous advantages.

Use of recycled fiber material as raw material is also the main source of hydrophobic substances, so called stickier, in the paper and board making. While some or even most of these hydrophobic substances are removed during the pulping of recycled fiber raw material, substantial amounts are still carried over to the paper or board making process. Hydrophobic substances, which have not been removed in deinking or other recycled fiber processing stage, and which are not trapped by the screens, enter the paper or board machine and circulate in the process waters. Due to the increased environmental awareness and regulations, papermaking processes have become more and more closed and use less fresh water. This results in heavy accumulation of interfering substances, including hydrophobic substances, in the fiber suspension and process waters. These substances may flocculate or agglomerate into bigger hydrophobic particles, which are capable of forming deposits.

In addition to the recycled fiber material, reuse of mill broke and/or coated broke can also cause similar problems as described above for paper mill processes. Coated broke contaminant deposition in papermaking systems can cause serious operational problems if left uncontrolled. Coated broke is repulped and used as a furnish source at most coated fine paper mills. The most difficult problem involved with recycling coated broke is derived from the binder materials, sometimes in combination with pigments or fillers, since these polymers and the materials to which they have been attached, are the origin of sticky deposits. These sticky deposits cause difficulties when recycled back to the paper machine operation.

Modern papermaking processes using high-speed machines are very sensitive to disturbances. One of the important factors limiting productivity on a high-speed paper machine is the formation of deposits. Formed deposits may cause web breakages, so as a precautionary measure the most affected surfaces, such as drying cylinders, calenders, wires and felts, are regularly washed and cleaned, which leads to downtime and loss of production.

The circulating hydrophobic substances may be controlled by adding chemicals to the papermaking process in order to build a boundary layer of hydrophilic material around hydrophobic particles to decrease their tendency to deposit, i.e. to make them less tacky. The colloidal stability of small hydrophobic particles may be enhanced by surfactants and dispersants, which prevent their agglomeration and deposition on the surfaces. Cationic high charged polymers such as homopolymers of diallyldimethyl-ammonium chloride (DADMAC) are conventionally used as fixatives to control hydrophobic substances, such as pitch and stickies, through fixation. Nonionic polymers, such as polyvinyl alcohol, and copolymers, such as polyacrylamide-vinyl acetate, have been used for stickies control through detackification. Alum, starches and low molecular weight cationic coagulants are used conventionally for deposit control, as they can neutralize anionic trash and detrimental substances including pitch and stickies at least partly by complex formation. However, it has been observed that these complexes may become concentrated in the process and lead to further deposition problems.

Conventional retention aid polymers, such as conventional polyacrylamide emulsions have also relatively high molecular mass values, which limit their dosage amounts in order not to over-flocculate fiber stock in the wet end. Over-flocculation is known to harm paper formation and to negatively affect paper strength. Typically, the molecular mass values of conventional polyacrylamide emulsions are in the range of 10-20 million Dalton, which correspond to polymer standard viscosities>4.5 mPas.

There is a need for new additives and methods for their application systems that are easy and cost-effective for use in manufacturing of paper and/or board, which provide retention enhancement without over-flocculating fiber stock and destruction sheet formation and which also enhance or at least maintain strength of paper or board.

SUMMARY OF THE INVENTION

The present invention provides a novel method and composition for enhancing the efficiency of starch adsorption (i.e., starch trapping and protection from degradation) from starch-containing furnishes comprising recycled fibers, mill broke fibers, and/or process water from pulp, paper, or board production by a novel polymer coagulation system in which two quick inversion cationic emulsion polymers are co-mixed at an optimal blend ratio during the emulsion inverting/makedown process and added to furnishes prior to formation of paper or board in a paper machine. It is shown herein that inverted solutions of cationic quaternary co-polyacrylamide starch trapping polymers A and B, when co-mixed at an optimal blend ratio and added to starch-containing recycled OCC stock, provide a synergistic increase in starch trapping efficiency without over-flocculation and without formation of large stickies typically observed when using conventional starch trapping polymers for papermaking or other methods.

In typical paper manufacturing applications, the OCC plant creates high density fiber stock via thickeners, then dilutes the high-density stock with white water before entering into a paper machine mixing/blend chest. The dynamic drainage analyzer (DDA) test is utilized to simulate OCC plant thickening and paper machine sheet making processes.

In particular, the DDA test results herein demonstrate that inverted co-mixed solutions of polymers A and B, when combined at optimal blend ratios (e.g., A/B≥1) and added to (i) recycled kraft linerboard OCC stock containing low fines and having 1% consistency (i.e., prior to thickening in the OCC plant) and (ii) diluted stock from DDA fiber cakes (i.e., DDA wet pad stock) containing low fines and having 0.65% consistency (i.e., prior to forming, pressing, and/or drying in the paper machine), results in enhanced starch trapping efficiencies from the DDA filtrates and enhanced starch retention in the formed DDA wet pads.

In particular, it has been further demonstrated that co-mixed solutions of polymers A and B, when combined at optimal blend ratios (e.g., A/B<1) and added to (i) North American customer OCC stock containing high fines and having 1% consistency (i.e., prior to thickening in the OCC plant) and (ii) DDA wet pad stock containing high fines and having 0.65% consistency (i.e., prior to forming, pressing, and/or drying in the paper machine), results in enhanced starch trapping efficiencies from the DDA filtrates and enhanced starch retention in the formed DDA wet pads.

Taken together, the DDA test results herein provide proof of concept that inverted co-mixed solutions of polymers A and B, when blended at optimal ratios and used as starch trapping polymers in OCC thick stock treatments in the OCC plant provide (i) increased retention of recycled starch within recycled fiber before said recycled fiber enters OCC plant thickeners and (ii) provide enhanced starch trapping efficiencies and retention during sheet making processes on a paper machine.

The subject methods and compositions for enhancing the efficiency of starch adsorption by treating starch-containing fiber stock comprising a high content of recycled fibers and/or mill broke fibers, and/or starch-containing process water from pulp, paper, or board production, with co-mixed solutions of starch trapping polymers A and B affords the following advantages when effected prior to formation of recycled paper or board:

(1) starch trapping cationic emulsion polymers A and B, are lower molecular weight (MW) than conventional starch trapping polymers; consequently, A and B are quick inversion polymers, which undergo the inversion process faster without aging/mixing tanks than conventional high MW alternatives;

(2) polymers A and B may be synthesized off site, delivered to paper mill, and then co-mixed on-site;

(3) polymers A and B may be pre-blended off site, prior to arrival at the paper mill (4) polymers A and B may be used as pump and go products, optionally not requiring conventional polymer inverting and aging tanks;

(5) co-mixing of polymers A and B on-site is flexible, allowing easy alteration of blend ratios to meet specific recycled fiber and process water requirements for different recycled fiber plants;

(6) co-mixed solutions of polymers A and B provide for enhanced retention of colloidal fines from fiber stock;

(7) co-mixed solutions of polymers A and B provide for deposit formation control or inhibition of the amount of hydrophobic substances such as stickies or flocs in the recycled stock;

(8) co-mixed solutions of polymers A and B provide for enhanced retention of protected starches (both fresh and recycled) for incorporation into paper or board (e.g., on a paper machine) with minimal sheet formation issues;

(9) co-mixed solutions of polymers A and B provide synergistic or additive increase in starch trapping efficiency over equivalent dosages of A or B alone;

(10) co-mixed solutions of polymers A and B provide improvement in starch retention, drainage, and fixation at elevated polymer dosage levels (e.g., above 0.3 kg/ton) without forming large stickies or flocs, which could troublingly result in deposition or sheet formation issues on paper machine.

Exemplary Embodiments of the Invention

The present invention provides a method for treating starch-containing fiber stock comprising a high content of recycled fibers and/or mill broke fibers, optionally a starch-containing thick fiber stock, optionally starch-containing process water from pulp, paper, or board production, the method comprising obtaining said fiber stock and/or process water and treating said fiber stock and/or process water with:

a) starch trapping polymer A having polymer standard viscosity of between 3 to 3.5 cPs and approximately (wherein "approximately" means ±0.5 mol %) 15-23 mol % cationic monomer content, or approximately 17-22 mol % cationic monomer content or 19-21 mol % cationic monomer content or approximately 20 mol % cationic monomer content, and b) starch trapping polymer B having polymer standard viscosity of between 1.5 to 2.0 cPs and approximately (wherein "approximately" means ±0.5 mol %) 25-45 mol % cationic monomer content, or approximately 28-42 mol % cationic monomer content or approximately 30-40 mol % cationic monomer content, wherein said polymers A and B are preferably i) quick inversion reverse phase cationic emulsion polymers, ii) co-mixed at an optimal blend ratio, said comixing typically not requiring conventional polymer inverting and/or aging tanks, iii) inverted and added to said fiber stock and/or process water preferably at dosages wherein said inverted co-mixed cationic polymer solution elicits a synergistic or additive increase in starch trapping efficiency, compared to the administration of polymer A or polymer B alone, when said inverted co-mixed cationic polymer solution is added at the same combined dosage amount as polymer A or polymer B alone, and iv) optionally after addition of said inverted co-mixed cationic polymer solution, the resulting mixture is used for the manufacture of paper or board.

In some exemplary embodiments according to the foregoing, starch trapping polymers A and B are obtained by reverse phase emulsion polymerization of a monomer blend comprising non-ionic monomers, 15-50 mol-% cationic monomers, optionally at most 50 ppm of a crosslinking agent, and a chain transfer agent.

In some exemplary embodiments according to any of the foregoing, starch trapping polymer A has approximately 20 mol % cationic monomer content.

In some exemplary embodiments according to any of the foregoing, starch trapping polymer B has approximately 30-40 mol % cationic monomer content.

In some exemplary embodiments according to any of the foregoing, the reverse phase emulsion of cationic polymer A has a standard viscosity of 3-3.5 cPs when measured by a Brookfield viscometer with UL adapter at 25° C. on a 0.1% by weight polymer solution in 1 M NaCl.

In some exemplary embodiments according to any of the foregoing, the reverse phase emulsion of cationic polymer B has a standard viscosity of 1.5-2 cPs when measured by a Brookfield viscometer with UL adapter at 25° C. on a 0.1% by weight polymer solution in 1 M NaCl.

In some exemplary embodiments according to any of the foregoing, the amount of crosslinking agent is preferably in the range of 5-30 ppm (wherein ppm denotes mg of solute per liter of solution).

In some exemplary embodiments according to any of the foregoing, the cationic monomers comprise one or more selected from diallyldimethylammonium chloride (DADMAC); acryloyloxyethyltrimethylammonium chloride; methacrylates of N,N-dialkylaminoalkyl compounds; and quaternaries and salts thereof, such as N,N-dimethylaminoethylacrylate methyl-chloride salt; monomers of N,N-dialkylaminoalkyl (meth)acrylamides; and salts and quaternaries thereof, such as N,N-dialkylaminoethylacrylamides; methacrylamidopropyltrimethylammonium chloride; 1-methacryloyl-4-methyl piperazine and the like.

In some exemplary embodiments according to any of the foregoing, the nonionic monomers comprise one or more selected from acrylamide; methacrylamide; N-alkyl acrylamides, such as N-methylacrylamide, N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone, and the like.

In some exemplary embodiments according to any of the foregoing, starch trapping polymer A is a quick inversion cationic emulsion polymer co-polyacrylamide comprising cationic quaternary amine side chains.

In some exemplary embodiments according to any of the foregoing, starch trapping polymer B is a quick inversion cationic emulsion polymer co-polyacrylamide comprising cationic quaternary amine side chains.

In some exemplary embodiments according to any of the foregoing, polymer A is a quick inversion cationic emulsion polymer co-polyacrylamide comprising cationic quaternary amine side chains and has a polymer standard viscosity (SV) of between 3 to 3.5 cPs and approximately (wherein "approximately" means ±0.5 mol %) 15-23 mol % cationic monomer content, or approximately 17-22 mol % cationic monomer content or 19-21 mol % cationic monomer content or approximately 20 mole % Q9 cationic monomer and polymer B is a quick inversion cationic emulsion polymer co-polyacrylamide comprising cationic quaternary amine side chains having polymer standard viscosity (SV) of between 1.5 to 2.0 cPs and 30 to 40 mole % Q9 cationic monomer content.

In some exemplary embodiments according to any of the foregoing, starch trapping polymer A and starch trapping polymer B are co-mixed during the emulsion inverting and/or makedown process at an optimal co-mixing ratio for starch removal.

In some exemplary embodiments according to any of the foregoing, the co-mixing blend ratio of polymer A/polymer B ranges from 90/10 to 50/50 when trapping starch from recycled fiber containing LOW levels of fines.

In some exemplary embodiments according to any of the foregoing, the co-mixing blend ratio of polymer A/polymer B ranges from 80/20 to 60/40 when trapping starch from recycled fiber stock containing LOW levels of fines.

In some exemplary embodiments according to any of the foregoing, the co-mixing blend ratio of polymer A/polymer B is 70/30 when trapping starch from recycled fiber stock containing LOW levels of fines.

In some exemplary embodiments according to any of the foregoing, the co-mixing blend ratio of polymer A/polymer B ranges from 10/90 to 1/99 when trapping starch from recycled fiber stock containing HIGH levels of fines.

In some exemplary embodiments according to any of the foregoing, the co-mixing blend ratio of polymer A/polymer B is less than 1/99 when trapping starch from recycled fiber stock containing HIGH levels of fines.

In some exemplary embodiments according to any of the foregoing, the fiber stock is obtained from a papermaking machine which entirely or predominantly uses recycled paper.

In some exemplary embodiments according to any of the foregoing, the fiber stock comprises a high content (e.g., over 50%) of recycled fibers, and/or mill broke, based on dry paper or board.

In some exemplary embodiments according to any of the foregoing, the fiber stock comprises fibers originating from recycled paper, old corrugated containerboard (OCC), mixed office waste (MOW), old magazine (OMG), unbleached kraft pulp, neutral sulphite semi chemical (NCCS) pulp and/or mechanical pulp.

In some exemplary embodiments according to any of the foregoing, the fiber stock comprises at least 50%, 60%, 70%, 80%, 90% or 100% recycled fibers and/or the pretreated fiber stock is from a papermaking process using a paper machine that uses at least 60%, 70%, 80%, 90% or 100% recycled fibers.

In some exemplary embodiments according to any of the foregoing, the OCC recycled fiber contains approximately 5% native size press starch and starch gel that may be reclaimed for use in the manufacture of paper or board.

In some exemplary embodiments according to any of the foregoing, the starch is derived from the recycled fibers and/or mill broke fibers in the stock and/or is added to the treated fiber stock.

In some exemplary embodiments according to any of the foregoing, the treatment is effected prior to the use of the treated fiber stock in a papermaking process or other industrial process using cationic functional polymers or other papermaking chemicals.

In some exemplary embodiments according to any of the foregoing, the inverted co-mixed solution of starch trapping polymers A and B is added to said fiber stock prior to washing and/or cleaning and/or thickening, wherein said fiber stock has consistency (i.e., percent oven dry mass in the stock) of less than approximately 10%, 5%, 2%, 1%, or 0.65%.

In some exemplary embodiments according to any of the foregoing, the inverted co-mixed solution of starch trapping polymers A and B is added to said fiber stock prior to forming and/or pressing and/or drying, wherein said fiber stock has consistency (i.e., percent oven dry mass in the stock) of approximately 10-30%.

In some exemplary embodiments according to any of the foregoing, the inverted co-mixed solution of starch trapping polymers A and B is added in an amount of 0.1-2.72 kg (as is)/ton produced paper or board.

In some exemplary embodiments according to any of the foregoing, the inverted co-mixed solution of starch trapping polymers A and B is added in an amount of 0.52-0.87 kg (as is)/ton produced paper or board.

In some exemplary embodiments according to any of the foregoing, the treated fiber stock is used in the manufacture of paper, board or the like.

The invention also provides a paper or board obtained by the method according to any of the foregoing.

In some exemplary embodiments according to any of the foregoing, the treatment of said fiber stock and/or mill broke with said co-mixed solution of starch trapping polymers A and B, when used in papermaking or other process using cationic polymers, results in enhanced efficiency of these cationic polymers, optionally cationic functional paper chemicals used in papermaking and/or facilitates the use of reduced amounts of cationic polymers, optionally functional paper chemicals used in papermaking.

In some exemplary embodiments according to any of the foregoing, the treatment provides for one or more of the following:
  i) synergistic or additive increase in starch trapping efficiency;
  ii) enhanced retention of protected starches (both fresh and recycled) for incorporation into paper or board (e.g., on a paper machine) with minimal sheet formation issues;
  iii) improvement in starch retention, drainage, and fixation;
  iv) enhanced retention of colloidal fines;
  v) control or inhibition of the amount of hydrophobic substances such as stickier or flocs in the recycled stock;
  vi) provides for increased starch trapping efficiencies which unlike conventional retention polymers is not fiber dependent, optionally when added at dosages of over 0.3 Kg/ton;
  vii) reduction of sheet formation issues on paper machines due to over-flocculation of fibers and stickier or flocs formation;
  viii) any combination of (i) to (vii).

The invention also provides a composition comprising a combination of quick inversion cationic emulsion of starch trapping polymers comprising:
  a) starch trapping polymer A having polymer standard viscosity of between 3 to 3.5 cPs and approximately (wherein "approximately" means ±0.5 mol %) 15-23 mol % cationic monomer content, or approximately 17-22 mol % cationic monomer content or 19-21 mol % cationic monomer content or approximately 20 mol % cationic monomer content, and
  b) starch trapping polymer B having polymer standard viscosity of between 1.5 to 2.0 cPs and approximately wherein "approximately" means ±0.5 mol %) 25-45 mol % cationic monomer content, or approximately 28-42 mol % cationic monomer content or approximately 30-40 mol % cationic monomer content, wherein said polymers A and B are preferably
  i) quick inversion reverse phase cationic emulsion polymers,
  ii) co-mixed at an optimal blend ratio, said comixing typically not requiring conventional polymer inverting and/or aging tanks,
  iii) inverted and are preferably comprised at relative dosages wherein said inverted co-mixed cationic polymer solution when added to fiber stock and/or process water comprising a high content of recycled fibers and/or mill broke fibers, optionally a starch-containing thick fiber stock, further optionally starch-containing process water from pulp, paper or board production elicits a synergistic or additive increase in starch trapping efficiency, compared to the administration of polymer A or polymer B alone, when these polymers are added at the same combined dosage amounts of polymer A and polymer B, and
  iv) after addition of said inverted co-mixed cationic polymer solution, the resulting mixture is optionally suitable for use for the manufacture of paper or board.

In some exemplary embodiments according to any of the foregoing, the invention provides a composition comprising starch trapping polymers A and B which are obtained by reverse phase emulsion polymerization of a monomer blend comprising non-ionic monomers, 15-50 mol % cationic monomers, optionally at most 50 ppm of a crosslinking agent, and a chain transfer agent.

In some exemplary embodiments according to any of the foregoing, the invention provides a composition comprising starch trapping polymer A which has approximately 20 mol % cationic monomer content.

In some exemplary embodiments according to any of the foregoing, the invention provides a composition comprising starch trapping polymer B which has approximately 30-40 mol % cationic monomer content.

In some exemplary embodiments according to any of the foregoing, the invention provides a composition comprising a reverse phase emulsion of cationic polymer A which has a standard viscosity of 3-3.5 cPs when measured by a Brookfield viscometer with UL adapter at 25° C. on a 0.1% by weight polymer solution in 1 M NaCl.

In some exemplary embodiments according to any of the foregoing, the invention provides a composition comprising a reverse phase emulsion of cationic polymer B which has a standard viscosity of 1.5-2 cPs when measured by a Brookfield viscometer with UL adapter at 25° C. on a 0.1% by weight polymer solution in 1 M NaCl.

In some exemplary embodiments according to any of the foregoing, the invention provides a composition comprising an amount of the crosslinking agent which is preferably in the range of 5-30 ppm.

In some exemplary embodiments according to any of the foregoing, the invention provides a composition comprising cationic monomers which comprise one or more selected from diallyldimethylammonium chloride (DADMAC); acryloyloxyethyltrimethylammonium chloride; methacrylates of N,N-dialkylaminoalkyl compounds; and quaternaries and salts thereof, such as N,N-dimethylaminoethylacrylate methyl-chloride salt; monomers of N,N-dialkylaminoalkyl (meth)acrylamides; and salts and quaternaries thereof, such as N,N-dialkylaminoethylacrylamides; methacrylamidopropyltrimethylammonium chloride; 1-methacryloyl-4-methyl piperazine and the like.

In some exemplary embodiments according to any of the foregoing, the invention provides a composition comprising nonionic monomers which comprise one or more selected from acrylamide; methacrylamide; N-alkyl acrylamides, such as N-methylacrylamide, N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone, and the like.

In some exemplary embodiments according to any of the foregoing, the invention provides a composition comprising starch trapping polymer A which is a quick inversion cationic emulsion polymer co-polyacrylamide comprising cationic quaternary amine side chains.

In some exemplary embodiments according to any of the foregoing, the invention provides a composition comprising starch trapping polymer B which is a quick inversion cationic emulsion polymer co-polyacrylamide comprising cationic quaternary amine side chains.

In some exemplary embodiments according to any of the foregoing, the invention provides a composition comprising starch trapping polymer A and starch trapping polymer B which are co-mixed during the emulsion inverting and/or makedown process at an optimal co-mixing ratio for starch removal.

In some exemplary embodiments according to any of the foregoing, the invention provides a composition comprising a co-mixing blend ratio of polymer A/polymer B which ranges from 90/10 to 50/50.

In some exemplary embodiments according to any of the foregoing, the invention provides a composition comprising a co-mixing blend ratio of polymer A/polymer B which ranges from 80/20 to 60/40.

In some exemplary embodiments according to any of the foregoing, the invention provides a composition comprising a co-mixing blend ratio of polymer A/polymer B which is 70/30.

In some exemplary embodiments according to any of the foregoing, the invention provides a composition comprising a co-mixing blend ratio of polymer A/polymer B which ranges from 10/90 to 1/99.

In some exemplary embodiments according to any of the foregoing, the invention provides a composition comprising a co-mixing blend ratio of polymer A/polymer B which is less than 1/99.

The invention also provides a composition comprising a starch-containing fiber stock which comprises a high content of recycled fibers and/or mill broke fibers, optionally a starch-containing thick fiber stock, optionally starch-containing process water from pulp, paper or board production, which comprises and/or has been treated with a composition comprising a combination of quick inversion cationic emulsion starch trapping polymers according to any of the foregoing.

BRIEF DESCRIPTION OF THE DRAWINGS

The invention will be described in more detail with reference to appended drawings, described in detail below.

DETAILED DESCRIPTION OF THE INVENTION

Figure 1:
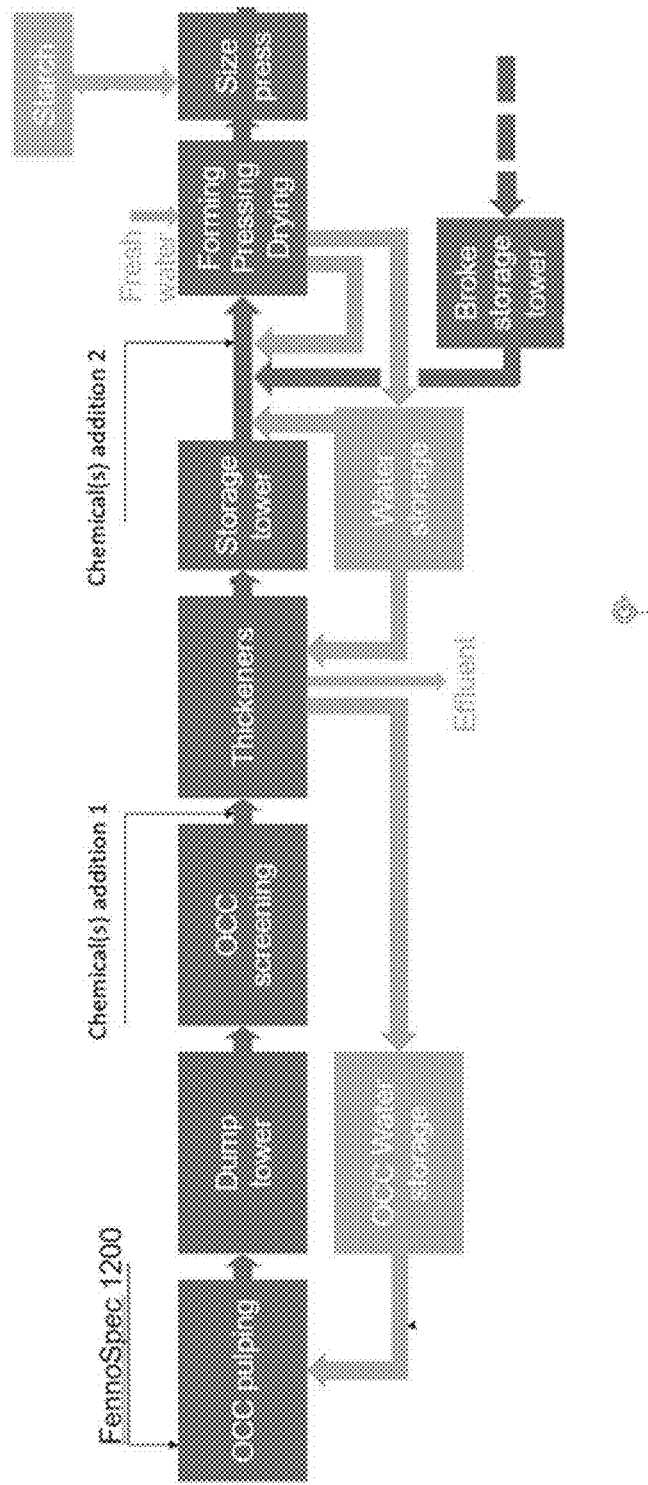
FIG. 1 provides an exemplary flow chart of one of many possible methods for using co-mixed solutions of starch trapping polymers A and B for treatment of starch-containing fiber stock and/or mill broke fibers and/or process water in the manufacture of paper or board according to Example 1.

Before describing the invention, the following definitions are provided. Unless stated otherwise all terms are to be construed as they would be by a person skilled in the art.

Definitions

As used herein, the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "fiber" refers to the basic structural unit of paper or board.

As used herein, the terms "recycled fiber" and "recovered fiber", refer to paper, paperboard, and fibrous wastes from retail stores, office buildings, homes, manufacturing plants, and so forth, after they have passed through their end-usage as a consumer item. Manufacturing wastes include: dry paper and paperboard waste generated after completion of the papermaking process including by way of example: envelope cuttings, bindery trimmings, and other paper and paperboard waste resulting from printing, cutting, forming, and other converting operations; bag, box, and carton manufacturing wastes; mill wrappers, and rejected unused stock; and repulped finished paper and paperboard from obsolete inventories of paper and paperboard manufacturers, merchants, wholesalers, dealers, printers, converters, or others. In particular the term "recycled fibers" includes recycled fibers derived by processing of paper and other consumer cellulosic materials, e.g., paper, old corrugated containerboard (OCC), mixed office waste (MOW), old magazine (OMG), unbleached kraft pulp, neutral sulphite semi chemical (NCCS) pulp and/or mechanical pulp. Source materials for recycled fibers may be selected from old corrugated containerboard, mixed office waste, old newsprint, old magazines, double liner kraft, and any mixtures thereof. Mixed waste (MXW) denotes recycled mixture of recycled board, such as OCC, white lined chipboard and/or folding boxboard, and recycled paper, such as old newsprint, old magazines and/or office waste papers. Mixed office waste denotes recycled fiber material mainly containing copying papers, printer papers and offset papers. Double lined kraft denotes recycled fiber material comprising clean sorted unprinted corrugated cardboard cartons, boxes, sheet or trimmings, e.g. of kraft or jute liner. White lined chipboard (WLC) denotes multiply board comprising deinked fiber material and/or un-deinked recycled fiber material originating e.g. from OCC, mixed office waste or old newspapers (ONP) in or more of the layers. Presence of any of these recycled fiber materials in the fiber suspension usually decreases drainage and paper strength and provides a substantial load of starch, hydrophobic, and colloidal substances to the process. According to one preferable embodiment the recycled fiber material may be selected from old corrugated containerboard or mixed waste or old newsprint without deinking stage.

As used herein, the term "OCC" refers to old corrugated cardboard and/or containerboard. Corrugated refers to those boxes where the materials are made from three separate layers of paper, two liners and a corrugated, or wavy, layer sandwiched between them. Brown paper bags are commonly accepted with OCC for recycling. The term OCC denotes recycled fiber material which have liners of test liner, jute or kraft, and may cover also double sorted corrugated containerboard (DS OCC).

As used herein, the terms "broke" or "mill broke" refer to paper, which during the paper making process becomes suitable only for repulping e.g. trimmings or paper that is out of specification. Broke is re-used material which never left the mill is not regarded as recycled or recovered. Broke is a valuable source of fiber and is recycled internally at the mill.

As used herein, the term "coated broke" refers to broke that contains coatings that are applied to the base sheet of paper as it is being manufactured. When the broke contains these coatings, it presents special problems in recycling to recover fiber values because the coatings introduce materials which would not normally be present in the original stock of fiber used to manufacture the base paper sheet. The coated broke may also contain dyes and/or other additives. In the present application coated broke includes surface-sized, dyed, and/or creped broke.

As used herein, the term "recycled fiber composition" generally refers to a composition comprising recycled cellulosic fibers, typically a composition wherein most or all are recycled fibers, e.g., at least 40, 50, 60, 70, 80, 90 or 100%.

As used herein, the term "fiber suspension" is understood as an aqueous suspension, which comprises fibers, preferably recycled fibers, and optionally fillers. For example, the fiber suspension may comprise at least 5%, preferably 10-30%, more preferably 11-19% of mineral filler. Mineral filler may be any filler conventionally used in paper and board manufacturing, such as ground calcium carbonate, precipitated calcium carbonate, clay, talc, gypsum, titanium dioxide, synthetic silicate, aluminium trihydrate, barium sulphate, magnesium oxide or their any of mixtures.

As used herein, the term "slurry" generally refers to a mixture of water, dissolved paper pulp, and optionally other soluble or insoluble components produced or added during the stock preparation phase of papermaking.

As used herein, the term "furnish" generally refers to a mixture of cellulosic fibers, pulp, optional fillers, dyes, and/or sizing, and water from which paper or board is made.

As used herein, the term "thick stock" generally refers to mixture of papermaking pulp and other materials with a consistency of about 1 to 5%.

As used herein, the term "thin stock" generally refers to a mixture of papermaking pulp and other materials, after having been diluted to a consistency below 1% with whitewater or other process water at a fan pump.

As used herein, the term "white water" generally refers to process water within a paper machine system, especially referring to water that is drained from paper as the sheet is being formed.

As used herein, the term "hydrophobics" or "hydrophobic substances" are in the present context fully interchangeable and synonymous and they are used herein to encompass all hydrophobic interfering substances present in papermaking, potentially causing deposits, including stickies and pitch.

As used herein, the term "stickies" means synthetic hydrophobics originating e.g. from adhesives, such as pressure sensitive adhesives, hot-melt adhesives, dispersion adhesives, and solvent adhesives, including styrene butadiene rubber (SBR), ethylene vinyl and polyvinyl acetate, polyvinyl acrylate, polyethylene, polyisoprene, polyisobutene, polybutadiene, polyamide, polyurethane, polyvinyl alcohol, polyvinyl propionate, polyvinyl ether, polyester, acrylic acid ester, block copolymers, wax, natural or modified resins; printing inks, such as absorbing, oxidizing, radiation curing printing inks and xenographic toners, including mineral oil, wax, hydrocarbon and alkyd resins, rosin esters, unsaturated fatty acids, epoxy, polyol, urethane, polyester, polyvinyl and styrene acrylates, polyester and hydroxyl polyester, polyvinyl butyral; coating binders, such as latex, and polyvinyl acetates and acrylates; waxes used in cartons for packaging; and hydrophobic internal and surface sizing agents. Because they are deformable, stickies cannot be completely excluded by pressure screens. The main culprit in stickies is polyvinylacetate (PVA) and other binders in the "pressure-sensitive" labels that have become common in mail and packages which can cling together and tend to build up into globs or strings, adhere to papermaking equipment, fill felts, and/or make spots in paper products.

As used herein, the term "pitch" means natural hydrophobics and wood derivates, such as wood extractives, sterols, fatty acids, resin acids, fatty esters, including their salts and other forms thereof.

As used herein, the concept "deposit formation control" means prevention or reduction of deposit formation caused by the hydrophobic substances in a paper or board making process by their removal by fixation onto the fibers. The present invention is efficient in controlling deposit formation of hydrophobic substances by fixing them onto the fibers.

As used herein, the term "fines" generally may refer to mineral fractions that may comprise a particle diameter smaller than 125 P filter pore (e.g., particle diameter smaller than 0.76 micron or 200 mesh suspended particles).

As used herein, the term "surface sizing" generally refers to the application of a solution, often containing starch, to the surface of paper, usually in order to increase surface strength, and sometimes with addition of hydrophobic polymers or other material at the paper surface.

As used herein, the term "internal sizing" generally refers to treatment of the fiber slurry so that the paper will resist fluids.

As used herein, the terms "fixation", "fixing" and "fix" means that a substance is associated or attached onto the fibers at least temporarily or permanently.

As used herein, the term "flocculation" generally refers to the tendency for fibers to collect together in bunches in the presence of flow, and especially in the presence of retention aids; the same word also refers to the action of high-mass polymers in forming bridges between suspended colloidal particles, causing strong, relatively irreversible agglomeration.

As used herein, the terms "polymer" or "polymeric additives" and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, for example, polymerizing, a particular monomer. Unless otherwise specified, a polymer may also comprise a "copolymer" that may comprise two or more different recurring units that may be formed by, for example, copolymerizing, two or more different monomers, and/or by chemically modifying one or more recurring units of a precursor polymer. Unless otherwise specified, a polymer or copolymer may also comprise a "terpolymer" which generally refers to a polymer that comprises three or more different recurring units. Any one of the one or more polymers discussed herein may be used in any applicable process, for example, as a flocculant and/or starch trapping additive.

As used herein, the term "monomer" generally refers to nonionic monomers, anionic monomers, cationic monomers, zwitterionic monomers, betaine monomers, and amphoteric ion pair monomers.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

As used herein, the term "cationic monomer" generally refers to a monomer that possesses a positive charge or a monomer that is positively charged at a pH within the normal operating range of paper machine processes.

As used herein, the term "nonionic monomer" generally refers to a monomer that possesses a neutral charge.

As used herein, the term "water-soluble" generally refers to polymer products that are fully miscible with water. When mixed with excess of water, the cationic emulsion polymer in the polymer product is preferably fully dissolved and the obtained polymer solution is preferably free from discrete polymer particles or granules.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. In some instances, PAMs may comprise anionic PAMs (APAMs), cationic PAMs (CPAMs), and/or sulfonated PAMs (SPAMs).

As used herein, the terms "DPAM", "CPAM", and "GPAM" generally refer to cationic wet strength resins, which include PAM resins used in the manufacturing of moisture resistant paper grades such as liquid packaging, napkin, and paper towel. Positively charge resins electrostatically adsorb to negatively charged fines and fibers, increasing the global efficiency of the productive process. The term DPAM refers to polyacrylamides that are in dry form, e.g., powder form; CPAM refers to cationic polyacrylamides; GPAM refers to glyoxalated polyacrylamides. In some embodiments of the present invention, the effects of cationic wet strength resins may be further enhanced by addition of co-mixed starch trapping polymers A and B at optimal mixing ratios in various papermaking processes and applications.

As used herein, the term "Poly-DADMAC" refers to poly-diallylmethylammonium chloride which is a fully charged, cationic polymer often used as the standard for cationic demand titrations.

As used herein, the terms "papermaking process" and "papermaking application" generally refers to any process in which any form of paper and/or paperboard product may be produced. For example, such processes include making paper products from pulp, such as methods comprising forming an aqueous cellulosic papermaking furnish, draining the furnish to form a sheet, and drying the sheet. The steps of forming the papermaking furnish, draining and drying may be carried out in any conventional manner generally known in the art. In some instances, papermaking processes and applications may comprise the use of one or more polymer solutions, wherein said polymer solutions may comprise one or more DPAMs, one or more CPAMs, one or more GPAMs, one or more anionic dry polyacrylamides (ADPAM), and/or one or more polyaminoamideepichlorohydrin (PAE) resins, for example as paper strengthening agents and/or wet-strength agents.

As used herein, the terms "wet end of a paper machine" or "wet end" generally refer to the parts of a papermaking process between pulping (or bleaching) and wet-pressing of the paper.

As used herein, a "closed water system" refers to a papermaking process in which the amount of liquid effluent has been decreased, sometimes to zero (totally closed).

As used herein, the term "consistency" generally refers to percent oven dry mass in the stock, slurry, or furnish (i.e., 100%*oven dry mass/total mass).

As used herein, the term "ppm" refers to parts per million on the basis of milligrams of solute per liter of aqueous solution or slurry (e.g., mg/L).

As used herein, the terms "kg/t" or "kg/ton" denote kilograms of dry mass (additive, solute, and/or particle) per ton of slurry, stock, and/or furnish.

DESCRIPTION OF THE INVENTION

The present invention provides a novel method and composition for enhancing the efficiency of starch adsorption (i.e., starch trapping and protection from degradation) from starch-containing furnishes comprising high content of recycled fibers for use in paper making processes such as pulp, paper, or board production. A novel polymer coagulation system is disclosed in which two quick inversion cationic emulsion polymers (starch trapping polymers A and B) are co-mixed at optimal blend ratios to meet specific recycled fiber and process water requirements for different recycled fiber plants and added to furnishes prior to formation of paper or board in a paper machine. The combination of co-mixed starch trapping polymers A and B provide synergistic enhancements in (i) starch trapping efficiency and (ii) starch retention in the produced paper or board over equivalent dosage levels of singly administered polymer A, polymer B, or conventional starch trapping products, without over-flocculation or formation of stickies.

In exemplary embodiments the invention will comprise treating starch-containing fiber stock comprising a high content of recycled fibers and/or mill broke fibers, optionally a starch-containing thick fiber stock, optionally starch-containing process water from pulp, paper, or board production, the method comprising obtaining said fiber stock and/or process water and treating said fiber stock and/or process water with (1) starch trapping polymer A having polymer standard viscosity of between 3 to 3.5 cPs and approximately (wherein "approximately" means ±0.5 mol %) 15-23 mol % cationic monomer content, or approximately 17-22 mol % cationic monomer content or 19-21 mol % cationic monomer content or approximately 20 mol % cationic monomer content, and (2) starch trapping polymer B having polymer standard viscosity of between 1.5 to 2.0 cPs and approximately wherein "approximately" means ±0.5 mol %) 25-45 mol % cationic monomer content, or approximately 28-42 mol % cationic monomer content or approximately 30-40 mol % cationic monomer content, wherein said polymers A and B are preferably (i) quick inversion reverse phase cationic emulsion polymers, (ii) co-mixed at an optimal blend ratio, said comixing typically not requiring conventional polymer inverting and/or aging tanks, (iii) inverted and added to said fiber stock and/or process water preferably at dosages wherein said inverted co-mixed cationic polymer solution elicits a synergistic or additive increase in starch trapping efficiency, compared to the administration of polymer A or polymer B alone, when said inverted co-mixed cationic polymer solution is added at the same combined dosage amount as polymer A or polymer B alone, and (iv) optionally after addition of said inverted co-mixed cationic polymer solution, the resulting mixture is used for the manufacture of paper or board.

The cationic emulsion polymers suitable for use in the present invention are prepared by reverse phase emulsion polymerization of a monomer blend comprising non-ionic monomers and cationic monomers in the presence of a chain transfer agent to produce a cationic polymer product. For the present invention, starch trapping polymers A and B may be quick inversion cationic emulsion co-polyacrylamides comprising cationic quaternary amine side chains and having lower molecular weight (MW), lower standard viscosity (SV) and higher degrees of structural non-linearity than conventional linear high MW starch trapping polymers. Typically, the molecular weights of conventional polyacrylamide emulsions are in the range of 10-20 million Dalton, which correspond to polymer standard viscosities>4.5 mPas. Such relatively high MW and SV values limit their dosage amounts in order not to over-flocculate fiber stock in the wet end, which can harm paper formation and negatively affect paper strength.

The molecular weights of emulsion polymers A and B are controlled and reduced to an ideal range which is especially suitable for thick stock fixative applications, such as pitch control, white pitch deposit control, improved starch retention, drainage, and fixation without over-flocculating or forming large stickier and sheet formation issues at elevated polymer dosage levels (e.g., dosages above 0.3 kg/ton). Crosslinked three-dimensional (3-D) polymer structures with high degrees of branching are found to enhance starch adsorption, thick stock fixative treatments, and retention of colloidal fines more effectively than conventional unbranched linear retention aid polymers. Such polymers provide high degrees of dosage latitude providing performance enhancement without over-flocculating fiber stock and damaging sheet formation.

The present invention is based on the cationic emulsion polymers A and B having lower molecular weight and higher degree of branching than conventional retention aid polymers. An emulsion polymer according to exemplary embodiments of the present invention is achieved by using a chain transfer agent and a crosslinking agent to facilitate formation of polymer structures with lower molecular weights and optimal degrees of branching.

Polymerization is conducted in the presence of a chain-transfer agent to control the structure and solubility of the polymers. Many such chain transfer agents are well known to those skilled in the art. These include alcohols; mercaptans; thioacids; phosphites and sulfites, such as isopropyl alcohol and sodium hypophosphite, although many different chain-transfer agents may be employed. According to a preferred embodiment of the present invention sodium hypophosphite is used as a chain transfer agent. It is extremely important that optimum concentrations of chain-transfer agent be employed in order to produce a water-soluble product. Addition of too little chain-transfer agent produces a non-soluble copolymer product and the addition of too much chain-transfer agent produces a product with too low a solution viscosity, i.e. molecular weight. According to an embodiment of the present invention, a chain-transfer agent is added in an amount of 50-400 ppm of monomer amount.

Soluble, highly branched, copolymers A and B are obtained for use in accordance with the present invention when said chain-transfer agent is used at optimum concentration in conjunction with a crosslinking agent. Many such crosslinking agents are well known to those skilled in the art. Polyfunctional crosslinking agents should have at least some water solubility. Examples of those compounds containing at least two double bonds are methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide; and the like. Polyfunctional crosslinking agents containing at least one double bond and at least one reactive group include glycidyl acrylate; acrolein; methylolacrylamide; and the like. Polyfunctional crosslinking agents containing at least two reactive groups include aldehydes, such as glyoxal; diepoxy compounds and epichlorohydrin and the like. Crosslinking agents should be used in sufficient quantities to assure a highly branched copolymer product. According to one preferred embodiment of the present invention methylene bis-acrylamide is used as a crosslinking agent. The amount of the crosslinking agent is optionally at most 50 ppm and preferably in the range of 5-30 ppm.

In exemplary embodiments starch trapping polymers A and B are obtained by reverse phase emulsion polymerization of a monomer blend comprising non-ionic monomers, 15-50 mol-% cationic monomers, optionally at most 50 ppm (wherein ppm denotes mg of solute per liter of solution) of a crosslinking agent, and said chain transfer agent. In preferred embodiments, polymer A has approximately 20 mol % cationic monomer content, polymer B has approximately 30-40 mol % cationic monomer content, and the crosslinking agent is present in the range of 5-30 ppm. In preferred embodiments, reverse phase emulsion of cationic polymers A and B have standard viscosities of 3-3.5 cPs and 1.5-2 cPs, respectively, when measured by a Brookfield viscometer with UL adapter at 25° C. on a 0.1% by weight polymer solution in 1 M NaCl.

In exemplary embodiments the cationic branched polymer A comprises 15-23 mol-%, preferably 17-22 mol-%, and more preferably 19-21 or approximately 20 mol-% of structural units derived from cationic monomers. The percentage values are calculated from the total dry weight of the polymer. In exemplary embodiments, cationic monomers may be selected from the group comprising diallyldimethylammonium chloride (DADMAC); acryloyloxyethyltrimethylammonium chloride; methacrylates of N,N-dialkylaminoalkyl compounds; and quaternaries and salts thereof, such as N,N-dimethylaminoethylacrylate methyl-chloride salt; monomers of N,N-dialkylaminoalkyl (meth)acrylamides; and salts and quaternaries thereof, such as N,N-dialkylaminoethylacrylamides; methacrylamidopropyltrimethylammonium chloride; 1-methacryloyl-4-methyl piperazine and the like. In preferred embodiments, the cationic monomer may include Q9. In exemplary embodiments nonionic monomers may be selected from acrylamide; methacrylamide; N-alkyl acrylamides, such as N-methylacrylamide, N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone, and the like.

The methods and compositions of the current invention may comprise any starch containing thick or thin stock comprising recycled fibers, and/or mill broke fibers, and or process water from pulp, paper, or board production. In exemplary embodiments, the fiber stock comprises at least 50%, 60%, 70%, 80%, 90% or 100% recycled fibers and/or the pretreated fiber stock is from a papermaking process using a paper machine that uses at least 60%, 70%, 80%, 90% or 100% recycled fibers. Such fibers contain a significant amount of starch that could be reused in manufacturing of recycled paper and board products. In exemplary embodiments, OCC recycled fiber may contain approximately 5% native size press starch and starch gel that may be reclaimed for use in the manufacture of paper or board, said starch being derived from the recycled fibers and/or mill broke fibers in the stock and/or is added to the treated fiber stock. Typically, recycled fiber material comprises low molecular weight starch, which originates from the surface sizing of the paper or board and retains poorly on fibers, as it typically uncharged or has slightly anionic charge. Inverted co-mixed solutions of starch trapping polymers A and B increase the retention of starch within recycled fiber stock at the wet end of paper or board manufacturing processes, before recycled fibers enters a paper machine.

Wet end applications of the current invention comprise addition of inverted co-mixed solutions of starch trapping polymers A and B to thick stock and/or to thin stock. Thick stock is here understood as a fibrous stock or furnish, which has consistency of above 1% (i.e., above 10 g dry solids/L of stock) and thin stock has consistency of below 1% (i.e., below 10 g dry solids/L of stock).

Applications of the present invention comprise addition of inverted co-mixed solutions of polymers A and B to fiber stock fractions wherein starch trapping has been empirically determined to be most efficient. Said fiber stock fractions may comprise elevated amounts of low molecular weight (LMW) starch, hydrophobics, fines, filler/pigment, dye or the like. A thick or thin stock may comprise fiber fractions originating from different sources. Inverted co-mixed solutions of starch trapping polymers A and B are effective at retaining and fixing starch originating especially from recycled fiber materials and/or mill broke and/or coated broke. Recycled fibers may be mixed with optional other stock fractions, such as broke, kraft pulp or mechanical pulp. According to embodiments of the present invention, said fiber stock is obtained from a papermaking machine which entirely or predominantly uses recycled paper, comprises a high content (e.g., over 50%) of recycled fibers, and/or mill broke, based on dry paper or board. According to embodiments of the present invention, said fiber stock comprises fibers originating from recycled paper, old corrugated containerboard (OCC), mixed office waste (MOW), old magazine (OMG), unbleached kraft pulp, neutral sulphite semi chemical (NCCS) pulp and/or mechanical pulp.

Recycled fiber material, mill broke, and/or coated broke which is suitable for the present invention typically contain variable amounts of colloidal fines, colloidal particles, filler, hydrophobic, and hydrophilic particles, depending on fiber source and paper mill processing methods. Additionally, fiber suspensions are often diluted with paper mill white water, which also contains variable amounts of colloidal fines and the like. Consequently, furnish or fiber stock which is suitable for the present invention may contain low levels of fines (e.g., fines content ranging from 0.1%-5%, more typically 0.1%-0.2% on a mass dry fine to volume basis) or high levels of fines (e.g., fines content ranging from 5%-15%). The definition of "fines" for the current application is any suspended particle smaller than 125 P filter (e.g., 0.76 micron or 200 mesh).

Starch trapping systems suitable for the present invention employ co-mixed solutions of quick inversion cationic emulsion polymers A and B, which may be used as pump and go products, optionally not requiring conventional polymer inverting and aging tanks. By contrast, conventional polyacrylamide emulsions, such as cationic retention aids having molecular mass values in the range of 10 to 20 million Dalton and SV>4.5 mPas, do not instantly invert in water under a normal mixing speed (<500 RPM), and pre-diluted conventional polymer solutions should be aged for a minimum of 30 minutes prior to use.

Polymers A and B may be synthesized off site, delivered to paper mill, and then co-mixed on-site. Alternatively, polymers A and B may be pre-blended off site, prior to arrival at the paper mill, then delivered as pre-blended emulsion polymers to customer sites. Co-mixing on site is flexible, allowing for easy customization of blend ratios to meet specific recycled fiber and process water requirements for different recycled fiber plants. In exemplary embodiments, co-mixed quick inversion polymer solutions can be produced by simultaneously injecting two emulsions into a high shear water pump, and then the mixture is further inverted via a static mixer before pumping the co-mixed polymer solution onto paper machines.

A synergistic starch trapping effect is observed when polymer A is used in combination with an optimized percentage of polymer B. Polymer A has higher molecular weight than polymer B and has been found to be more effective at mechanical retention; i.e., polymer A is better for fiber to fiber bridging. Polymer B has lower molecular weight than polymer A and has been found to be more effective at fixation of pitch to fiber; i.e. polymer B is a better fixative. Without being bound by theory, it can be reasoned that the combination of polymers A and B at an optimal blend ratio provides both optimal fixation and better mechanical retention, providing a possible mechanistic rationale for the synergistic benefits of co-mixing.

Optimal blend ratios (mass ratio of polymer A/mass of polymer B) are dependent on many variables including, but not limited to, paper mill, point of addition to the paper making process, furnish characteristics including pH, conductivity, and content of starch, fines, hydrophobics, ash, and/or dyes. Optimal blend ratios are determined empirically by preliminary studies at each specific mill on a furnish by furnish basis. In exemplary embodiments, starch trapping polymers A and B are co-mixed during the emulsion inverting and/or makedown process at an optimal co-mixing ratio for starch removal. Blend ratios (A/B) may range from ~90/10 to less than 1/99, and preferably range from 85/15 to 15/85. At optimal blend ratios, the co-mixed polymer solutions elicit a synergistic or additive increase in starch trapping efficiency, compared to the administration of equivalent dosage levels of polymer A or polymer B alone, without over-flocculation or stickies formation.

It has been demonstrated that the overall starch trapping efficiency of polymer A is greater than polymer B, when treating fiber stocks containing low levels of fines. Additionally, it has been discovered that inverted co-mixed solutions of polymers A and B having blend ratios (A/B) greater than or equal to 1.0 provide a synergistic increase in starch trapping efficiency. In exemplary embodiments of the present invention, the co-mixing blend ratio of polymer A/polymer B ranges from 90/10 to 50/50, preferably from 80/20 to 60/40, more preferably 70/30 when trapping starch from recycled fiber containing LOW levels of fines.

It has been further demonstrated that the overall starch trapping efficiency of polymer B is greater than polymer A, when treating fiber stocks containing high levels of fines. It is reasoned that, because co-mixing of polymers A and B produce synergistic starch trapping effects, and polymer B is more effective for trapping starch from high fines stock than polymer A, optimal blend ratios for trapping starch from fiber stock containing HIGH levels of fines should contain polymer B in equimolar amounts or in excess of polymer A (e.g., A/B≤50/50). Optimal blend ratios for treating high fines stock may range from A/B=50/50 to <1/99 and will likely be furnish dependent and paper mill dependent. In exemplary embodiments the co-mixing blend ratio of polymer A/polymer B ranges from 10/90 to 1/99 when trapping starch from recycled fiber stock containing HIGH levels of fines. In other embodiments, the co-mixing blend ratio of polymer A/polymer B is less than 1/99 when trapping starch from recycled fiber stock containing HIGH levels of fines.

There are two main places in the wet end of manufacturing processes for paper or board where water is filtered and/or removed from OCC pulp and where starch is potentially degraded and/or not retained. These include but are not limited to (i) Chemical(s) addition point 1, upstream of thickening and/or (ii) Chemical(s) addition point 2, upstream of forming and/or pressing and/or drying. Chemical(s) addition point 1 denotes a point in the OCC plant that feeds directly into thickening, where dry content of pulp is increased with disc filters typically from approximately 1% consistency to 10-30% consistency. Chemical(s) addition point 2 denotes a point upstream of the forming section of the paper machine, where paper or board is formed, and/or pressed, and/or dried. Addition of starch trapping polymers at these points may substantially increase starch retention for reuse.

Exemplary embodiments of the current invention provide methods for using co-mixed solutions of starch trapping polymers A and B for treatment of starch-containing fiber stock and/or mill broke fibers and/or process water in the manufacture of paper or board. In preferred embodiments, the treatment is effected prior to the use of the treated fiber stock in a papermaking process or other industrial process using cationic functional polymers or other papermaking chemicals.

Said polymers A and B may be co-mixed at an optimal blend ratio during the emulsion inverting/makedown process and injected into the process stream at several points in the manufacturing process including, but not limited to Chemical(s) addition point 1, upstream of thickening, wherein said fiber stock has consistency (i.e., percent oven dry mass in the stock) of less than approximately 10%, 5%, 2%, 1%, or 0.65%. Addition of the inverted solution of cationic polymer to the fiber suspension before the thickening step are advantageous as the enrichment of the starch to the water circulation is effectively prevented in the most processes, and a large amount of starch is effectively retained on the fibers.

Said co-mixed solutions of polymers A and B may also be added at Chemical(s) addition point 2, upstream of forming and/or pressing and/or drying, wherein said fiber stock has consistency (i.e., percent oven dry mass in the stock) of approximately 10-30%. Said methods of the current invention are effected to trap and retain starch that may otherwise be lost or degraded, thereby protecting reusable starch for incorporation into paper or board. Optimal blend ratios are empirically pre-determined for each paper mill and fiber stock composition to elicit a synergistic or additive increase in starch trapping efficiency without over-flocculation of fibers or formation of hydrophobic substances, such as stickier or flocs, in the recycled stock.

Co-mixed solutions of starch trapping polymers A and B may also be added to the fiber suspension before washing and/or cleaning of the fiber suspension for improving starch retention and filtration of the fiber suspension, wherein it may be achieved cleaner filtrate, and higher fines content in fiber suspension to which hydrophobics, sizing agent, fillers, dyes or the like can associate. Co-mixed solutions of polymers A and B may also be added to fiber suspensions before a machine chest or before a mixing chest of a paper or board machine.

Because of high polymer molecular weights of the conventional retention aid polymers, dosage level of them is typically limited below 0.45 kg/ton (where kg/ton denotes mass of dry polymer per ton of process slurry), and often limited to below 0.3 kg/ton, in order not to over-flocculate fiber stock in the wet end. Co-mixed solutions of cationic emulsion polymers A and B, according to the present invention provide a solution for over-flocculation problems at doses (i.e., combined mass of polymers A and B) well over 0.45 kg/ton. Additionally, co-mixing of polymers A and B provides synergistic enhancements in starch trapping efficiency over either polymer A or B, singly administered at equivalent dosages, wherein polymer A (1 kg A/ton), polymer B (1 kg B/ton), and co-mixed A and B (1 kg co-mix/ton) are considered equivalent dosages.

For the present invention, co-mixed solutions of quick inversion cationic emulsion polymers A and B may be added to starch-containing fiber stock and/or mill broke fibers and/or process water in the manufacture of paper or board at dosage levels ranging from 0.23-2.72 kg/ton, preferably from 0.3-1.0 kg/ton, and more preferably from 0.5-0.7 kg/ton. According to embodiment of the present invention, an inverted co-mixed solution of starch trapping polymers A and B may be added in an amount of 0.1-2.72 kg (as is)/ton, preferably in an amount of 0.52-0.87 kg (as is)/ton. Optimal dosage levels for plant applications will be dependent on paper mill, recycled fiber and furnish characteristics, consistency, point of addition, and blend ratio (A/B). Co-mixed polymers A and B of the present invention provide great dosage latitude for increased starch trapping and retention without over-flocculating or damaging sheet formation.

A preferred embodiment of the present invention provides a starch-containing fiber stock comprising a high content of recycled fibers and/or mill broke fibers, optionally a starch-containing thick fiber stock, optionally starch-containing process water from pulp, paper or board production, which comprises and/or has been treated with a composition comprising a combination of quick inversion cationic emulsion starch trapping polymers (e.g., a co-mixed inverted solution of polymers A and B at optimal blend ratio) according to any of the foregoing.

Paper to be manufactured by the method according to the present invention may be any kind of paper or board comprising recycled fiber material and/or mill broke and/or coated broke.

Additional advantages of methods and compositions of the present invention include improved retention and/or fixation of starch, most importantly low molecular weight (LMW) starch, which may be slightly charged or non-ionic, can be retained and/or fixed on fibers, which is difficult to achieve with conventional retention aids. Also, retention of cationic wet-end starch might be improved, potentially allowing decrease of its dosage. The cationic charge assists in fixing starch onto anionic fibers. Co-mixed solutions of polymers A and B have improved capability of retaining and fixing hydrophobics, ash, dyes, and/or colloidal fines and may interact beneficially with optional anionic additives (APAMs), cationic additives (CPAMs, GPAMs, DPAMs), or other papermaking additives such as paper strengthening agents and/or wet-strength agents (e.g., PAE), thereby enhancing their performance. As a result of improved starch retention and/or fixation, improved dewatering rate may result in cleaner filtrates such as filtrate from optional stock thickening step, or cleaner white water can be obtained, improving the overall quality of water circulation at the paper mill.

Having described the invention in detail the invention is further described in the following examples.

EXAMPLES

The following examples are presented for illustrative purposes only and are not intended to be limiting.

Example 1: Flow Diagram Showing Exemplary Locations for Injection of Co-Mixed Starch Trapping Polymers A and B An exemplary flow chart of one of many possible methods for using co-mixed solutions of starch trapping polymers A and B for treatment of starch-containing fiber stock and/or mill broke fibers and/or process water in the manufacture of paper or board is shown in FIG. 1. The flow chart depicts a manufacturing process for paper or board wherein two quick inversion cationic emulsion polymers A and B are co-mixed at an optimal blend ratio during the emulsion inverting/makedown process and injected into the process stream to trap and retain starch, thereby protecting reusable starch from degradation. Optimal blend ratios are empirically predetermined for each paper mill and fiber stock composition to elicit a synergistic or additive increase in starch trapping efficiency without over-flocculation of fibers or formation of hydrophobic substances, such as stickier or flocs, in the recycled stock.

The inverted co-mixed polymer solutions may be added at several points in the manufacturing process including, but not limited to, Chemical(s) addition point 1 (prior to thickening) and/or Chemical(s) addition point 2 (prior to forming, pressing, and/or drying). These points of addition constitute two main locations where water is filtered and/or removed from OCC pulp and where starch is potentially lost or degraded. Addition of starch trapping polymers at these points may substantially increase starch retention for reuse.

Chemical(s) addition point 1 denotes a point in the OCC plant that feeds directly into thickening, where dry content of pulp is increased with disc filters typically from approximately 1% consistency to 10-30% consistency. Chemical(s) addition point 2 denotes a point upstream of the forming section of the paper machine, where paper or board is formed, and/or pressed, and/or dried. Addition of inverted co-mixed polymer solutions to paper machine processes at Chemicals) addition points 1 and/or 2 was simulated in a laboratory setting using Dynamic Drainage Analyzer (DDA) methods in order to facilitate evaluation of the effects of polymer blend ratio and injection point on total starch trapping efficiency. Starch trapping efficiency DDA analyses are detailed in subsequent examples.

Characteristics of starch trapping polymers A and B, commercial polymeric additives, and commercial starch trapping polymers for this and all subsequent examples are listed in Table 1.

TABLE 1

| Polymer Name | Chemistry | Polymer Standard Viscosity, cps | Molecular Weight, Dalton | Cationic Monomer % in mole |
|---|---|---|---|---|
| Commercial Products | | | | |
| Biocide | 50% glutaraldehyde solution | | | |
| Enzyme Inhibitor | Zinc based salt solution | | | |
| Polyamine | Polyamine | | 100,000-200,000 | Charge density: 6.8 meq/dry gram |
| DPAM 1 | Copolymer acrylamide co-Q9, dry polymer | | 8-12 million | 15-25 mole % Q9 |
| DPAM 2 | Copolymer acrylamide co-Q9, dry polymer | | 10-15 million | 31-35 mole % Q9 |
| DPAM 3 | Copolymer acrylamide co-Q9, dry polymer | | 8-12 million | 34-46 mole % Q9 |
| P4 | Copolymer acrylamide co-Q9, emulsion polymer | 3.3 | | 40 mole % Q9 |
| Polymers of the present invention | | | | |
| Polymer A | Copolymer acrylamide co-Q9, emulsion polymer | 3.0-3.5 | | 20 mole % Q9 |
| Polymer B | Copolymer acrylamide co-Q9, emulsion polymer | 1.7-1.9 | | 30 mole % Q9 |

Example 2: Starch Trapping Efficiencies of Polymers P4, A, B, and Polyamine Using DDA Method 1 and Linerboard OCC Stock Starch trapping efficiencies of polymer solutions were evaluated using recycled kraft linerboard OCC fiber stock (1% consistency) and DDA method 1 to simulate polymer addition to paper machine processes at Chemical(s) addition point 1 (prior to thickening).

Pulping of Linerboard OCC Stock (Low Fines)

Kraft linerboard OCC stock containing about 4% size press starch was used to produce 100% recycled fiber stock for all starch trapping polymer evaluations. First, the linerboard stock was soaked at 2.5% consistency (i.e., 2.5% percent oven dry mass in the pulp mixture) at 85° C. in chemical water (70% calcium acetate, 20% sodium sulfate, 10% sodium bicarbonate, conductivity 4 mS/cm, pH 7) for 5 minutes. Salts for chemical water were added as 10% concentrated solutions. The mixture was hot-disintegrated with a Maelstrom™ laboratory pulper. Target pulp freeness was 550 CSF. Prior to use in DDA testing, the pulp was cooled to room temperature. The linerboard stock was diluted with chemical water to 1% consistency and then amylase enzyme inhibitor at 300 ppm and biocide at 300 ppm (to control microbiological activity) were added for starch protection. The recycled kraft linerboard fiber stock was prepared the day before DDA tests were performed. Because kraft linerboard fiber stock, which typically contains low fines, was diluted with chemical water, which also contains little to no suspended solids, the resulting kraft linerboard stock was considered to contain low levels of fines.

DDA Method 1: Thickener Procedure with Linerboard OCC Stock (1% Consistency)

Starch trapping polymer solutions were added to kraft linerboard OCC stock (1% consistency, low fines) at dosage levels (mass of total dry polymer/ton of stock) of 0.52 kg/ton and 0.87 kg/ton. Solutions of quick inversion polymers A and B were injected singly or co-mixed at the desired blend ratio by simultaneously injecting two separate polymer emulsions into the same water beaker under agitation at 1500 RPM. Kemira commercial products were added according to standard methods. DDA analysis was performed to simulate polymer addition into paper machine processes at Chemical(s) addition point 1 (prior to thickening).

DDA analyses were performed on a Dynamic Drainage Analyzer (PulpEye DDA 5) benchtop analyzer that uses compressed air to generate vacuum drainage to gauge retention and drainage profiles of various stock furnishes. Shear was controlled to simulate paper machine conditions, including pumps and screens. Drainage speed and drain time were used to estimate the effect of chemical additives on drain time for a customer furnish or stock. Turbidity readings (taken within the unit itself or from the filtrate) were used to assess retention of fines and filler and other colloidal fractions within the furnish.

The DDA5 was used to evaluate the starch trapping effects of polymers on starch-containing furnishes. For DDA method 1, stock was used at high (1%) consistency to simulate thick stock additions very early in the system. Chemical introductions were made at time zero while mixing at 1000 rpm and the stock was mixed for 2 minutes before applying vacuum. After the vacuum peak was established, the DDA filtrate was tested for turbidity and residual starch. The fiber cake (DDA pad) was retained for further testing of wet end chemical additions if appropriate (see DDA method 2).

Starch content of DDA filtrates was measured using the standardized iodine staining analysis method. Polymer starch trapping efficiency is expressed as % reduction in starch in the filtrate as compared to the blank (no chemical treatment). The percent starch reduction in DDA filtrate over the blank is calculated as: ((Blank filtrate starch content—polymer filtrate starch content)/Blank filtrate starch content) *100%. The overall starch trapping efficiency of each polymer was determined by averaging the percent starch reduction in DDA filtrate for each polymer or co-mixed polymer solution at both dosage levels (e.g., 0.52 kg/ton and 0.87 kg/ton).

Figure 2:
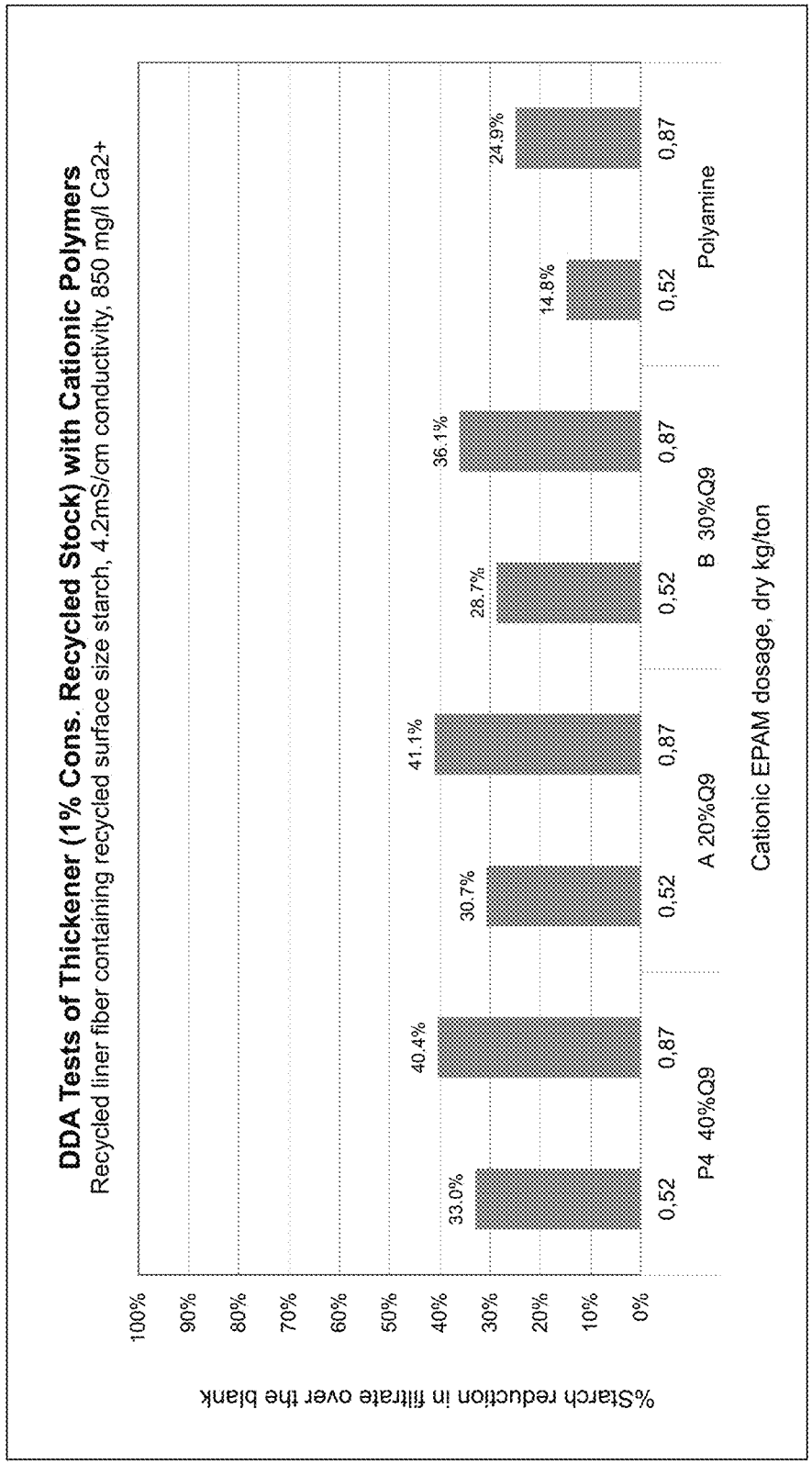
FIG. 2 provides an exemplary graph of variation of percent starch reduction in Dynamic Drainage Analyzer (DDA) filtrates (compared to untreated blank) following treatment of recycled kraft linerboard OCC stock (1% consistency, low fines) with (i) commercial starch retention aid polymer (P4), (ii) starch trapping polymer A, (iii) starch trapping polymer B, and (iv) high MW polyamine polymer, administered at dosages of 0.52 kg/ton and 0.87 kg/ton of according to Example 2.

For the present example, DDA method 1 was used to evaluate the percent starch reduction in DDA filtrates following treatment of linerboard OCC stock (1% consistency, low fines) with (i) commercial high charge emulsion starch retention aid polymer P4 (40% charge emulsion), (ii) quick inversion cationic emulsion starch trapping polymer A, with standard viscosity (SV) of 3.4 cPs, 20 mole-% Q9 (cationic monomer) content, and 38.3% active polymer content, (iii) quick inversion cationic emulsion starch trapping polymer B, with SV of 1.8 cPs, 30 mole-% Q9 content, and 38.3% active polymer content, and (iv) high MW polyamine polymer. An exemplary graph is shown in FIG. 2.

Results indicate that the overall starch trapping efficiency of polymer A with 20% charge was nearly equal to P4 with 40% charge. Polymer B, a lower MW emulsion with 30% charge, displayed lower starch trapping efficiency than polymer A at both dosage levels. Polyamine did not work well as a starch trapping polymer and was not tested in subsequent experiments.

Example 3: Starch Trapping Efficiencies of Polymer A, Co-Mixed A and B (80/20), and DPAMs Using DDA Method 1 and Linerboard OCC Stock Starch trapping efficiencies of co-mixed quick inversion polymers A and B (blend ratio A/B=80/20), polymer A, and commercial high charge DPAM polymers were evaluated using DDA method 1, as detailed in Example 2, to simulate addition of polymer solutions into paper machine processes at Chemical(s) addition point 1 (prior to thickening). Polymer solutions and linerboard OCC stock (1% consistency, low fines) were prepared and tested according to Example 2.

Figure 3:
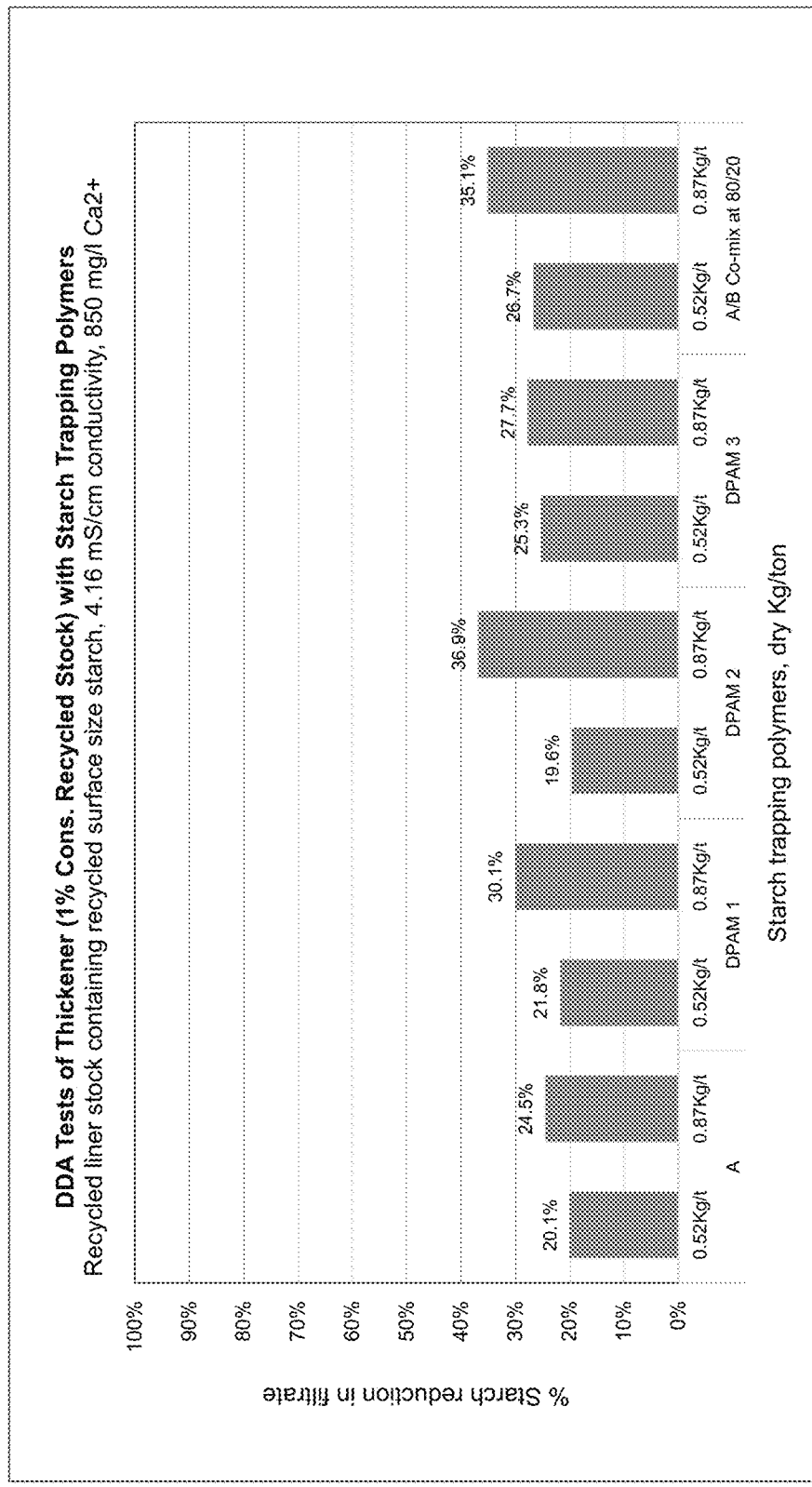
FIG. 3 provides an exemplary graph of variation of percent starch reduction in DDA filtrates (compared to untreated blank) following treatment of recycled kraft linerboard OCC stock (1% consistency, low fines) with (i) polymer A, (ii) DPAM 1, (iii) DPAM 2, (iv) DPAM 3, and (iv) co-mixture of starch trapping polymers A and B at blend ratio of 80/20, administered at dosages of 0.52 kg/ton and 0.87 kg/ton according to Example 3.

An exemplary graph of variation of percent starch reduction in DDA filtrates (compared to untreated blank) following treatment of recycled kraft linerboard OCC thick stock (1% consistency, low fines) with (i) starch trapping polymer A, (ii) DPAM 1, (iii) DPAM 2, (iv) DPAM 3, and (iv) co-mixture of A and B (A/B Co-mix at 80/20) is shown in FIG. 3.

Results indicate that the co-mixed 80/20 blend outperformed all other polymers at low dosage and, at high dosage, caused a similar percent starch reduction in DDA filtrates as the most effective DPAM (DPAM 2). The co-mixed 80/20 blend also displayed the highest overall starch trapping efficiency (average of both doses), due in large part, to enhanced starch trapping at lower dosage. Because polymer A alone outperformed polymer B alone, as shown in FIG. 2, it can be concluded that the overall starch trapping efficiency of the 80/20 blend is also higher than polymer B alone.

These results provide proof of concept that co-mixing of A and B (blend ratio A/B=80/20) elicits a synergistic enhancement in overall starch trapping efficiency, compared to polymer A alone, polymer B alone, and commercial high charge high charge DPAM polymers at equivalent dosages. These results strongly suggest that the co-mixed 80/20 blend will provide enhanced starch retention when added at Chemical(s) addition point 1.

Example 4: Starch Trapping Efficiencies of Polymer A, Co-Mixed A and B (80/20), and DPAMs Using DDA Method 2 and Diluted DDA Pad Stock Starch trapping efficiencies of polymer solutions were evaluated using diluted DDA wet pad stock (0.65% consistency, low fines) and DDA method 2 to simulate polymer addition to paper machine processes at Chemical(s) addition point 2 (prior to forming, pressing, and/or drying).

Preparation of Diluted DDA Pad Stock (Low Fines)

Fiber cakes (DDA wet pads) from linerboard OCC stock retained for further testing from DDA method 1 (see Example 2) were diluted with chemical water and treated with cationic polymer/silica retention program (0.045 kg/t CPAM, 0.45 kg/t FS silica 2180) to provide diluted DDA pad stock (0.65% consistency, low fines). Because DDA wet pads and chemical water contain little to no fines, the diluted DDA pad stock is considered to contain low fines.

DDA Method 2: Paper Mill Procedure with Diluted DDA Pad Stock (0.65% Consistency)

The diluted DDA pad stock (0.65% consistency, low fines) was subjected to DDA analysis according to DDA method 1 (substituting diluted DDA pad stock in place of linerboard OCC stock) to simulate polymer addition into paper machine processes at Chemical(s) addition point 2. Starch trapping polymer solutions, co-mixtures, and Kemira commercial products were prepared and added at two dosage levels according to DDA method 1. Starch content of diluted DDA pad stock (0.65% consistency, low fines) and DDA filtrate was measured using standardized iodine staining analysis. The percentage of starch retained in the newly formed DDA pad after was calculated as: ((0.65% consistency stock starch−filtrate starch)/0.65% consistency stock starch)*100%.

Figure 4:
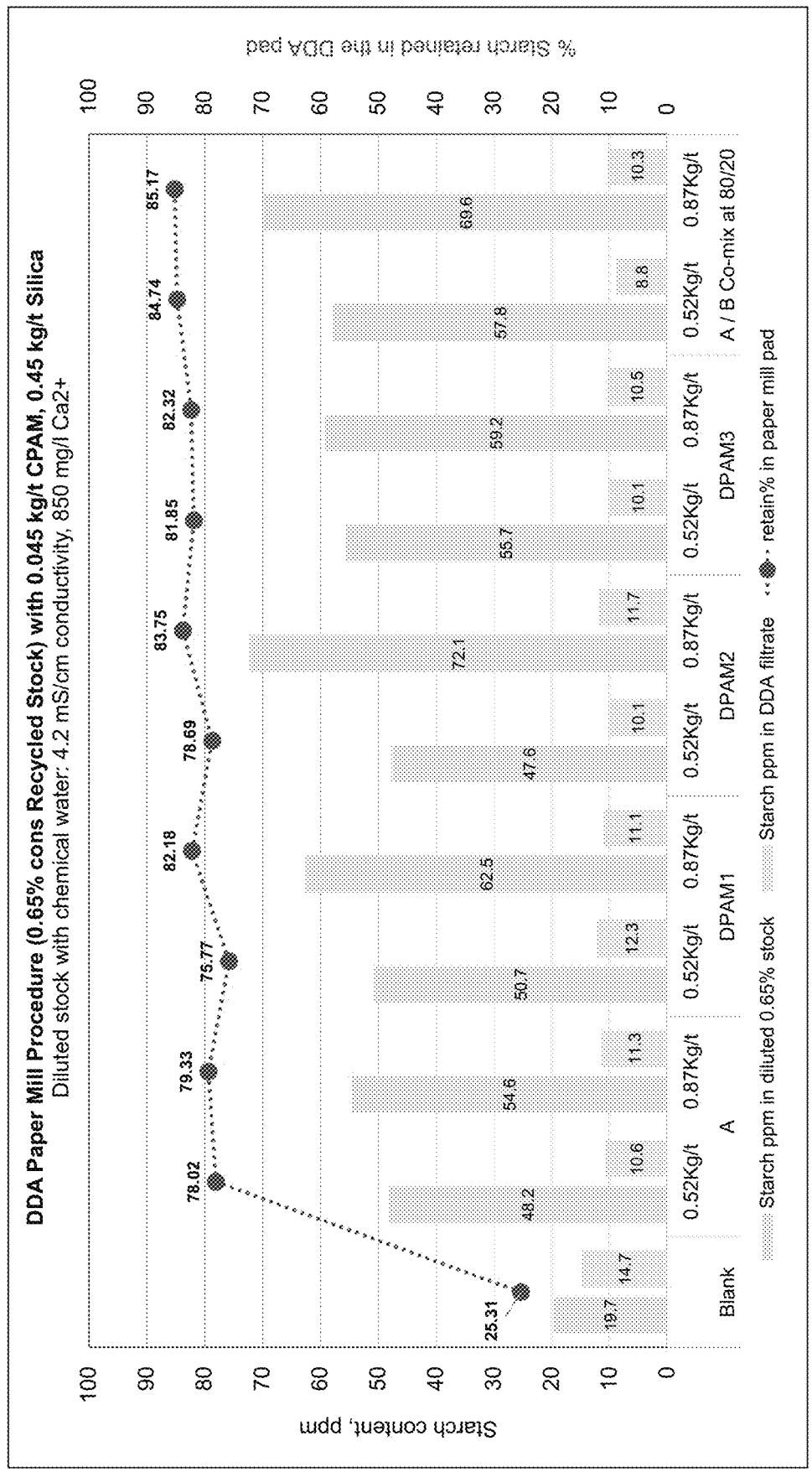
FIG. 4 provides an exemplary graph of variation of starch content (ppm) in diluted DDA pad stock at 0.65% consistency (left bars), starch content (ppm) in DDA filtrates (right bars), and percent starch retained in the DDA pad (blue circles) following treatment of diluted DDA pad stock (0.65% consistency, low fines) with (i) no treatment (blank), (ii) polymer A, (iii) DPAM 1, (iv) DPAM 2, (v) DPAM 3, and (iv) co-mixture of polymers A and B at 80/20 blend ratio, administered at dosages of 0.52 kg/ton and 0.87 kg/ton according to Example 4.

For the present example, starch trapping efficiencies of (i) no treatment (blank), (ii) polymer A, (iii) DPAM 1, (iv) DPAM 2, (v) DPAM 3, and (iv) co-mixture of polymers A and B (A/B at 80/20 blend ratio) were evaluated using DDA method 2. An exemplary graph of starch content in diluted DDA pad stock at 0.65% consistency (left bars), starch content in DDA filtrates (right bars), and percent starch retained in the DDA pad (blue circles) is shown in FIG. 4.

Results indicate that the co-mixed 80/20 blend provided the best (highest) percent starch retention in DDA pads at both low dosage and high dosage. The low dosage of 80/20 blend outperformed even the higher dosage of all other polymers tested, providing further proof of concept for synergistic enhancement in starch trapping efficiency. Additionally, these results demonstrate the starch trapping utility of co-mixed 80/20 blend for wet end paper mill applications at Chemical(s) addition point 2.

Figure 5:
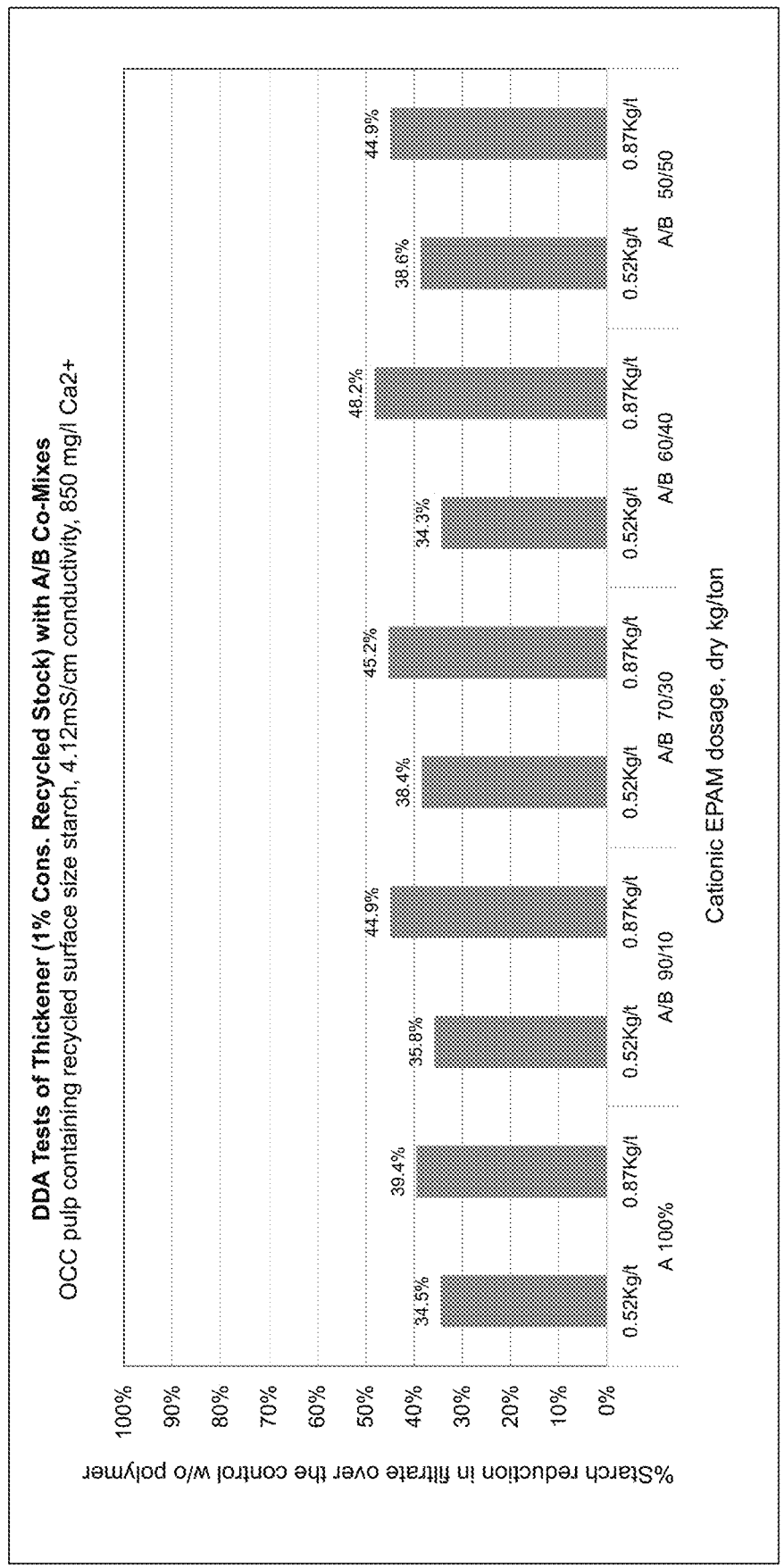
FIG. 5 provides an exemplary graph of variation of percent starch reduction in DDA filtrates (compared to untreated blank) following treatment of recycled kraft linerboard OCC stock (1% consistency, low fines) with polymer A (A 100%) and co-mixtures of A and B at blend ratios of 90/10, 70/30, 60/40 and 50/50, administered at dosages of 0.52 kg/ton and 0.87 kg/ton according to Example 5.

Example 5: Starch Trapping Efficiencies of Co-Mixed Polymers A and B (90/10-50/50) Using DDA Method 1 and Linerboard OCC Stock Starch trapping efficiencies of polymer A (A 100%) and co-mixed quick inversion starch trapping polymers A and B (blend ratios A/B=90/10, 70/30, 60/40, and 50/50) were evaluated using DDA method 1 (see Example 2) to simulate addition of polymer solutions into paper machine processes at Chemical(s) addition point 1 (prior to thickening), Linerboard OCC stock (1% consistency, low fines) and polymer solutions were prepared and tested according to Example 2. An exemplary graph of percent starch reduction in DDA filtrates is shown in FIG. 5.

Results indicate that co-mixtures of cationic polymers A and B at all blend ratios provided better starch trapping efficiency than singly administered polymer A. The co-mixed 70/30, 60/40, and 50/50 blends also displayed greater overall starch trapping efficiency (average of both doses) than polymer A and the 90/10 blend, providing further proof of concept that co-mixed solutions of polymers A and B provide synergistic increase in starch retention at optimal blend ratios.

These results also suggest that the optimal blend ratio of polymers A and B for trapping starch from linerboard OCC stock (1% consistency, low fines) at Chemical(s) addition point 1 (prior to thickening) is between 70/30 and approximately 50/50.

Figure 6:
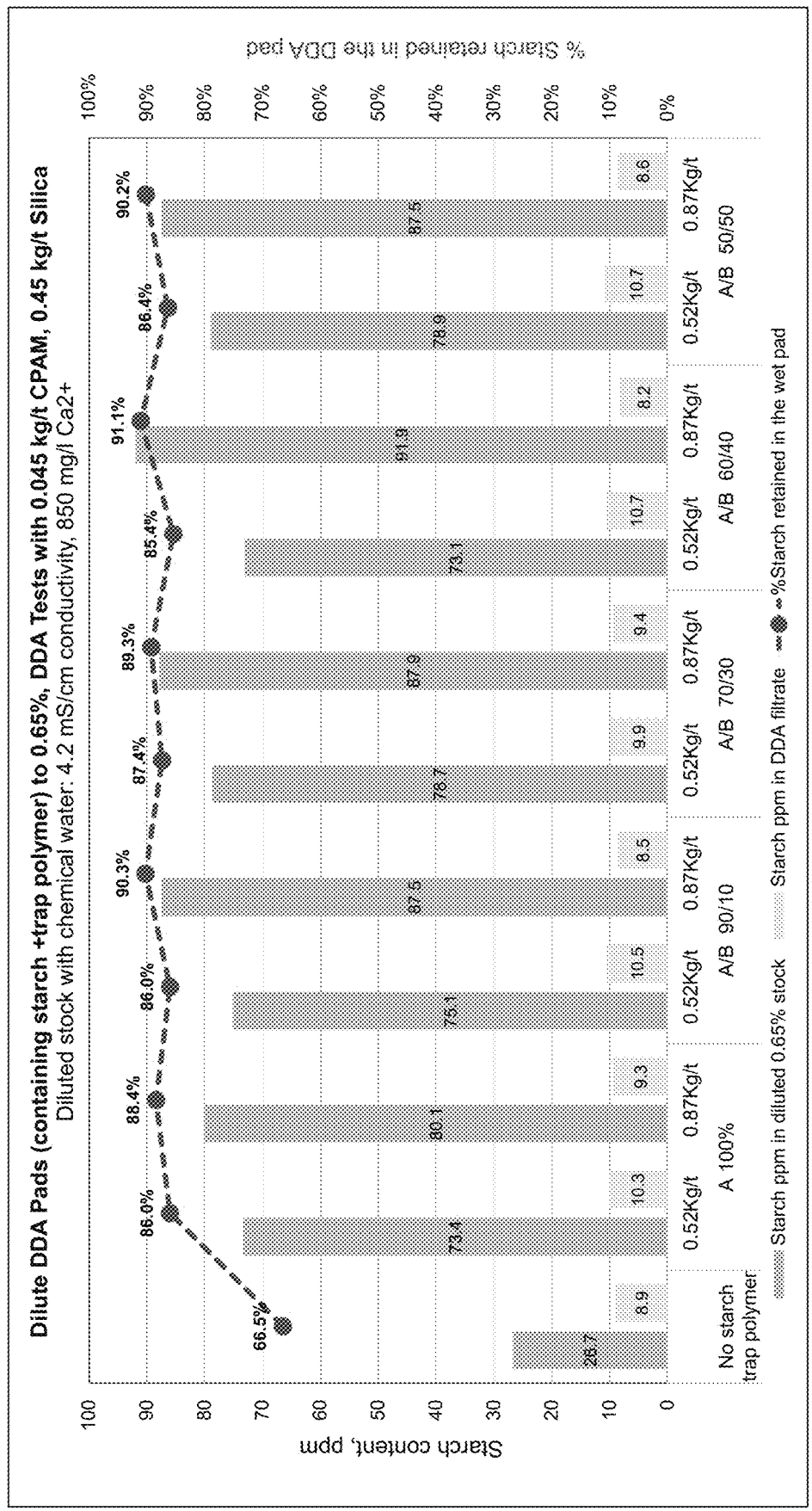
FIG. 6 provides an exemplary graph of variation of starch content (ppm) in diluted DDA pad stock at 0.65% consistency (left bars), starch content (ppm) in DDA filtrates (right bars), and percent starch retained in the DDA pad (blue circles) following treatment of diluted DDA pad stock (0.65% consistency, low fines) with (i) no polymer (blank), (ii) polymer A (A 100%), and (iii) co-mixtures of polymers A and B at blend ratios of 90/10, 70/30, 60/40 and 50/50, administered at dosages of 0.52 kg/ton and 0.87 kg/ton according to Example 6.

Example 6: Starch Trapping Efficiencies of Co-Mixed Polymers A and B (90/10-50/50) Using DDA Method 2 and Diluted DDA Pad Stock Starch trapping efficiencies of polymer A (A 100%) and co-mixed quick inversion starch trapping polymers A and B (blend ratios A/B=90/10, 70/30, 60/40, and 50/50) were evaluated using DDA method 2 (see Example 4) to simulate addition of polymer solutions into paper machine processes at Chemical(s) addition point 2 (prior to forming, pressing, and/or drying). Diluted DDA pad stock (0.65% consistency, low fines) and polymer solutions were prepared and tested according to Example 4. An exemplary graph of starch content in diluted DDA pad stock at 0.65% consistency (left bars), starch content in DDA filtrates (right bars), and percent starch retained in the DDA pad (blue circles) is shown in FIG. 6.

Results indicate that co-mixtures of cationic polymers A and B at all blend ratios provided better starch trapping efficiency than singly administered polymer A, especially at the high dosage level of 0.87 Kg/ton. These results provide further proof of concept that co-mixed solutions of A and B provide synergistic increase in starch retention. The overall starch trapping efficiency (average of both doses) of co-mixed A and B were similarly high at all blend ratios, suggesting a broad range of optimal blend ratios for use at Chemical(s) addition point 2.

Example 7: Starch Trapping Efficiencies of Polymers A, B, DPAM 2, and Co-Mixed A and B (70/30) Using DDA Method 1 and Customer OCC Stock (High Fines)

Starch trapping efficiencies of polymers A, B, DPAM 2 (with 31 mol % charge), and co-mixed A and B (blend ratio A/B=70/30) were evaluated using DDA method 1, substituting North American customer OCC stock (containing high fines) in place of linerboard OCC stock (low fines). Polymer solutions were prepared and added as detailed in Example 2, to simulate addition of polymer solutions into paper machine processes at Chemical(s) addition point 1 (prior to thickening).

North American Customer OCC Stock (High Fines)

OCC thick stock (~5% consistency) was obtained from a North American customer's paper mill. The customer stock was diluted with mill process water (white water) to 1% consistency, and then 800 ppm of cooked pearl starch was added to simulate the starch content in typical 100% OCC plant. FennoSpec 1200 (300 ppm) and FennoSan GL10 (300 ppm) were added to prevent starch degradation. The diluted customer stock was prepared the day before DDA tests were performed. Because the customer stock, containing high levels of fines, was diluted with white water, which contains variable amounts of fiber fines, colloidal particles, filler, hydrophobic, and hydrophilic particles, the resulting diluted customer stock (1% consistency, 800 ppm added starch) was considered to contain high levels of fines.

Figure 7:
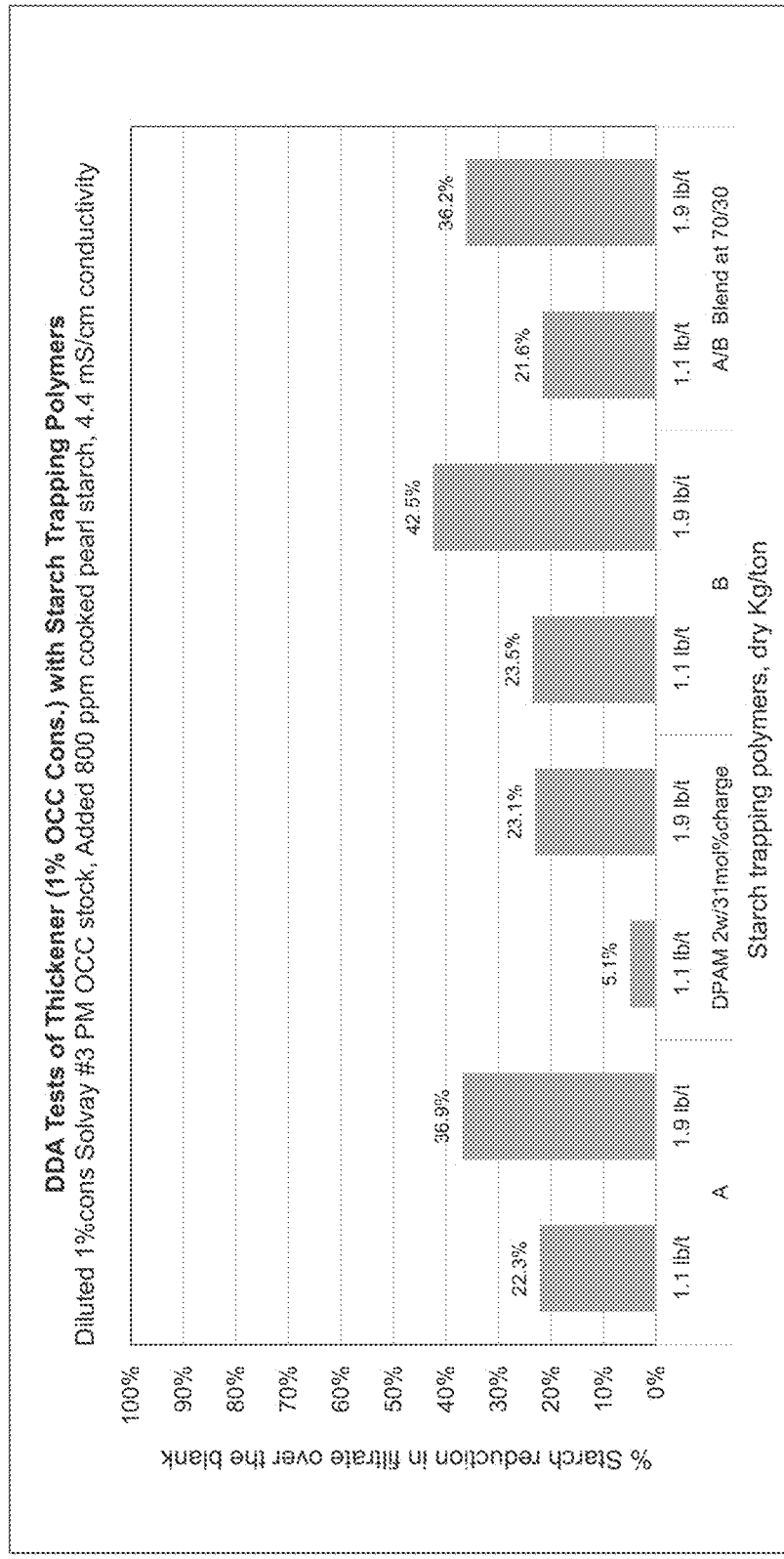
FIG. 7 provides an exemplary graph of variation of percent starch reduction in DDA filtrates (compared to untreated blank) following treatment of North American customer's OCC thick stock (1% consistency, high fines) with (i) polymer A, (ii) DPAM 2, (iii) polymer B, and (iv) co-mixture of polymers A and B at blend ratio of 70/30, administered at dosages of 0.50 kg/ton (1.1 lb/ton) and 0.86 kg/ton (1.9 lb/ton) according to according to Example 7.

For the present example, an exemplary graph of variation of percent starch reduction in DDA filtrates (compared to untreated blank) following treatment of diluted customer OCC stock (1% consistency, high fines) with (i) starch trapping polymer A, (ii) DPAM 2 (iii) starch trapping polymer B, and (iv) co-mixture of starch trapping polymers A and B at blend ratio of 70/30, administered at dosages of 0.50 kg/ton (1.1 lb/ton) and 0.86 kg/ton (1.9 lb/ton) is shown in FIG. 7.

Results indicate that polymer B provided the best starch trapping efficiency for this customer's OCC stock containing HIGH levels of fines. This was surprisingly not in agreement with Examples 3-6, wherein co-mixing of A and B (A/B ranging from 90/10-50/50) produced synergistic starch trapping improvements when treating linerboard OCC stock and diluted DDA pad stock containing LOW fines. In the present example, polymer B, a powerful fixation agent, was more effective for trapping starch in recycled fibers containing HIGH amounts of fines than polymer A and co-mixed A/B blend with A in excess (e.g., 70/30).

It can be concluded that, because co-mixing of A and B produce synergistic starch trapping effects, and polymer B is more effective at trapping starch from HIGH fines stock than polymer A, optimal blend ratios for trapping starch from OCC stock and process water containing HIGH fines should contain polymer B in equimolar amounts or in excess of polymer A (e.g., A/B≤50/50). Optimal blend ratios for treating HIGH fines stock at or near Chemical(s) addition point 1 may range from A/B=50/50 to <1/99 and will likely be furnish dependent and paper mill dependent.

Example 8: Starch Trapping Efficiencies of Polymers A, B, DPAM 2, and Co-Mixed A and B (70/30) Using DDA Method 2 and Diluted Customer DDA Pad Stock (High Fines)

Starch trapping efficiencies of polymers A, B, DPAM 2 (with 31 mol % charge), and co-mixed A and B (blend ratio A/B=70/30) were evaluated using DDA method 2 (see Example 4), substituting diluted customer DDA pad stock (containing high fines) in place of diluted DDA pad stock (low fines), to simulate addition of polymer solutions into paper machine processes at Chemical(s) addition point 2 (prior to forming, pressing, and/or drying).

Preparation of Diluted Customer DDA Pad Stock (High Fines)

Fiber cakes (DDA wet pads) from customer OCC stock retained for further testing from DDA method 1 (see Example 7) were diluted with white water and treated with GPAM and cationic polymer/silica retention program (0.045 kg/t CPAM, 0.45 kg/t FS silica 2180) to provide diluted DDA pad stock (0.65% consistency, high fines). Because customer stock and white water contain variable to high fines, the diluted DDA pad stock is considered to contain high fines.

Figure 8:
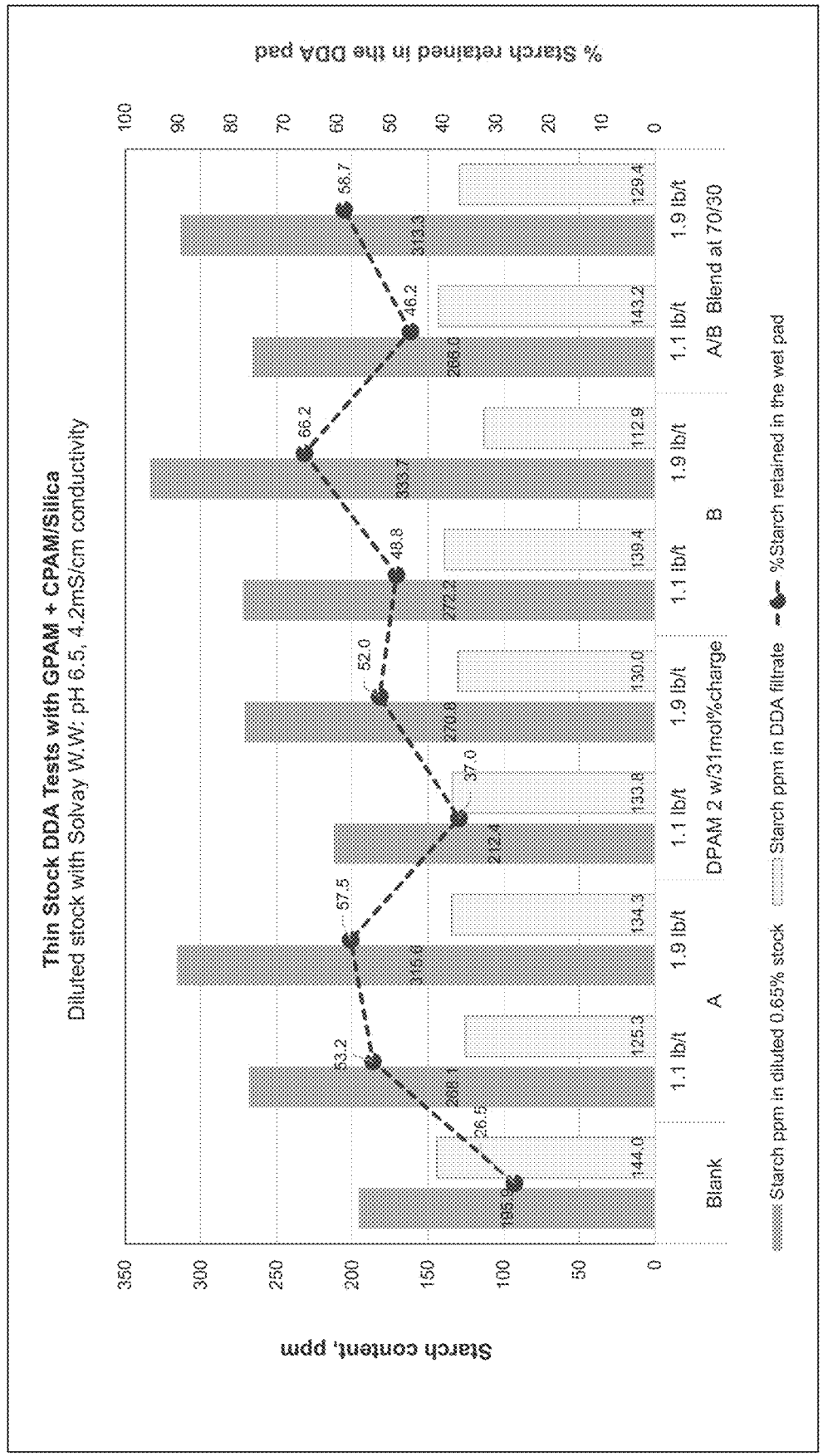
FIG. 8 provides an exemplary graph of variation of starch content (ppm) in diluted DDA pad stock at 0.65% consistency (left bars), variation of starch content (ppm) in DDA filtrates (right bars), and percent starch retained in the DDA pad (blue circles) following treatment of diluted DDA pad stock from a North American customer's paper mill (0.65% consistency, high fines) with (i) no polymer (blank), (ii) polymer A, (iii) DPAM 2, (iv) polymer B, and (v) co-mixture of polymers A and B at blend ratio of 70/30, administered at dosages of 0.50 kg/ton (1.1 lb/ton) and 0.86 kg/ton (1.9 lb/ton) according to Example 8.

Polymer solutions were prepared and tested at detailed in DDA method 2 (see Example 4). An exemplary graph of starch content in diluted customer DDA pad stock at 0.65% consistency (left bars), starch content in DDA filtrates (right bars), and percent starch retained in the DDA pad (blue circles) is shown in FIG. 8.

Results indicate that polymer B provided the best starch trapping efficiency for this customer's diluted DDA pad stock containing HIGH levels of fines. This is consistent with results of Example 7 and provides further proof of concept that, because polymer B is more effective at trapping starch from HIGH fines stock, optimal blend ratios for trapping starch from OCC stock and process water containing HIGH fines should contain polymer B in equimolar amounts or in excess of polymer A (e.g., A/B≤50/50). Optimal blend ratios for treating HIGH fines stock at or near Chemical(s) addition point 2 may range from A/B=50/50 to <1/99 and will likely be furnish dependent and paper mill dependent.

Having described exemplary embodiments of the invention, the invention is further described in the claims which follow.

Example 9: Preparation and Co-Mixing Blending of Polymers A and B

Emulsion polymerization procedures involve the preparation of two phases. The aqueous phase comprises acrylamide and acryloyloxyethyltrimethylamonium chloride (Q9), methylenebisacrylamide (crosslinking agent) and sodium hypophosphite (chain-transfer agent) dissolved in deionized water, and other additives well known to those skilled in this art, such as stabilizers and pH adjusters. The oil phase comprises a water-insoluble hydrocarbon solution of surfactants. The aqueous phase and oil phase are then mixed and homogenized in a conventional apparatus until particle size is in the 1.0 micron range and a suitable bulk viscosity is obtained. The emulsion is then transferred to a suitable flask wherein the emulsion is agitated and sparged with nitrogen, the temperature adjusted to 25° C. After the emulsion is sparged thirty minutes, a polymerization initiator, such as sodium metabisulfite solution or sulfur dioxide gas, is then continuously added to begin polymerization. Polymerization is allowed to exotherm to the temperature below 50° C. which is maintained by cooling until cooling is no longer required. At this point, the $SO_2$ flow rate is set back to the initial level and a heating mantle is used to maintain the temperature to 50° C. and hold for ~1.5 hours. Finished emulsion product is cooled to 25° C. The resulting emulsions are low viscosity fluids that can be easily dispersed in water and the emulsion quickly inverted to yield the desired water-soluble polymer solution.

Figure 9:
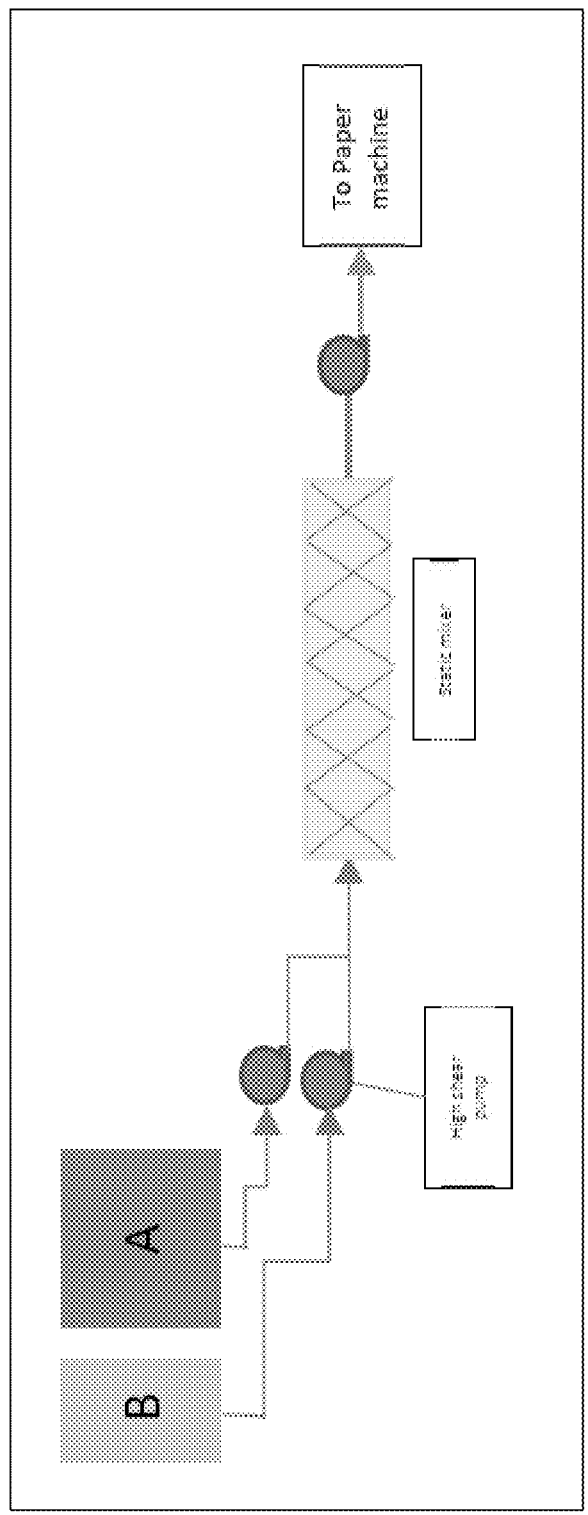
FIG. 9 provides a schematic diagram of a static mixer system to co-mix two polymers and invert the co-mixed emulsion in water according to Example 9.

Co-mixed quick inversion polymer solutions can be produced by simultaneously injecting two emulsions into a high shear water pump, and then the mixture is further inverted via a static mixer before pumping the co-mixed polymer solution onto paper machines. An exemplary flow chart of one of many possible methods for preparation and co-mixing/Blending of Polymers A and B is shown in FIG. 9.

What is claimed is:

1. A method for treating starch-containing fiber stock, the method comprising:
    (a) providing a starch-containing fiber stock comprising recycled fibers and/or mill broke fibers;
    (b) providing or obtaining a synthetic starch trapping polymer A having polymer standard viscosity of between 3 to 3.5 cPs and comprising 15-23 mol %, 17-22 mol %, 19-21 mol %, or 20 mol % of one or more cationic monomers; and
    (c) providing or obtaining a synthetic starch trapping polymer B having polymer standard viscosity of between 1.5 to 2.0 cPs and comprising 25-45 mol %, 28-42 mol %, or 30-40 mol % of one or more cationic monomers;
    (d) inverting said synthetic starch trapping polymers A and B; and
    (e) adding said synthetic starch trapping polymers A and B to said starch-containing fiber stock, thereby forming a treated fiber stock;
    wherein said synthetic starch trapping polymers A and B:
        (i) comprise quick inversion reverse phase cationic emulsion polymers,
        (ii) are added to said starch-containing fiber stock at an optimal blend ratio of polymer A/polymer B; and
        (iii) are added to said starch-containing fiber stock at a combined dosage of said synthetic starch trapping polymers A and B that is sufficient to elicit a synergistic or additive increase in starch trapping efficiency, compared to the administration the same dosage of polymer A or polymer B alone.

2. The method of claim 1, wherein:
    said synthetic starch trapping polymers A and B are obtained by reverse phase emulsion polymerization of a monomer blend comprising non-ionic monomers, 15-50 mol-% cationic monomers, 2-30 ppm or at most 50 ppm of a crosslinking agent, and a chain transfer agent, wherein ppm denotes mg of solute per liter of solution;
    (ii) said synthetic starch trapping polymer A comprises 20 mol % cationic monomer content;
    (iii) said synthetic starch trapping polymer B comprises 30-40 mol % cationic monomer content;
    (iv) said synthetic starch trapping polymer A has a standard viscosity of 3-3.5 cPs when measured by a Brookfield viscometer with UL adapter at 25° C. on a 0.1% by weight polymer solution in 1 M NaCl;
    (v) said starch trapping polymer B has a standard viscosity of 1.5-2 cPs when measured by a Brookfield viscometer with UL adapter at 25° C. on a 0.1% by weight polymer solution in 1 M NaCl;
    (vi) the cationic monomers are selected from the group consisting of diallyldimethylammonium chloride (DADMAC); acryloyloxyethyltrimethyl ammonium chloride (Q9); methacrylates of N,N-dialkylaminoalkyl compounds; and quaternaries and salts thereof, such as N, N-dimethylaminoethylacrylate methyl-chloride salt; monomers of N,N-dialkylaminoalkyl (meth)acrylamides; and salts and quaternaries thereof, such as N,N-dialkylaminoethylacrylamides; methacrylamidopropyltrimethylammonium chloride; and 1-methacryloyl-4-methyl piperazine;
    (vii) the nonionic monomers are selected from the group consisting of acrylamide; methacrylamide; N-alkyl acrylamides, such as N-methylacrylamide, N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone;
    (viii) said synthetic starch trapping polymer A is a quick inversion cationic emulsion polyacrylamide co-polymer comprising cationic quaternary amine side chains;
    (ix) said synthetic starch trapping polymer B is a quick inversion cationic emulsion polyacrylamide co-polymer comprising cationic quaternary amine side chains;
    (x) said synthetic starch trapping Polymer A comprises a quick inversion cationic emulsion polyacrylamide co-polymer comprising acrylamide and acryloyloxyethyltrimethyl ammonium chloride (Q9);
    (xi) said synthetic starch trapping Polymer B comprises a quick inversion cationic emulsion polyacrylamide co-polymer comprising acrylamide and acryloyloxyethyltrimethyl ammonium chloride (Q9); or
    (xii) any combination of (i) to (xi).

3. The method of claim 1, wherein the method further comprises, prior step (e), co-mixing of said synthetic starch trapping polymers A and B at said optimal blend ratio of polymer A/polymer B, wherein said synthetic starch trapping polymer A and synthetic starch trapping polymer B are co-mixed during the emulsion inverting step (d) and/or during polymer makedown, wherein said optimal blend ratio is optimal for starch removal, and wherein said co-mixing does not require conventional polymer inverting and/or aging tanks.

4. The method of claim 1, wherein:
(i) said optimal blend ratio of polymer A/polymer B ranges from 90/10 to 50/50 when trapping starch from a recycled fiber containing a percent by mass of a dry fines ranging from 0.1-5% or 0.1-0.2%;
(ii) said optimal blend ratio of polymer A/polymer B ranges from 80/20 to 60/40 when trapping starch from a recycled fiber stock containing a percent by mass of a dry fines ranging from 0.1-5% or 0.1-0.2%;
(iii) said optimal blend ratio of polymer A/polymer B is 70/30 when trapping starch from a recycled fiber stock containing a percent by mass of a dry fines ranging from 0.1-5% or 0.1-0.2%;
(iv) said optimal blend ratio of polymer A/polymer B ranges from 10/90 to 1/99 when trapping starch from a recycled fiber stock containing a percent by mass of a dry fines ranging from 5-15%;
(v) said optimal blend ratio of polymer A/polymer B is less than 1/99 when trapping starch from a recycled fiber stock containing a percent by mass of a dry fines ranging from 5-15%; or
(vi) any combination of (i) to (v), wherein said fines comprise particle sizes smaller than 0.76 micron.

5. The method of claim 1, wherein said starch-containing fiber stock:
(i) is obtained from a papermaking machine which uses recycled paper;
(ii) comprises a over 50% by weight of recycled fibers, and/or mill broke, based on dry paper or board;
(iii) comprises fibers originating from recycled paper, old corrugated containerboard (OCC), mixed office waste (MOW), old magazine (OMG), unbleached kraft pulp, neutral sulphite semi chemical (NCCS) pulp and/or mechanical pulp;
(iv) comprises at least 50%, 60%, 70%, 80%, 90% or 100% recycled fibers and/or pretreated fiber stock from a papermaking process using a paper machine that uses at least 60%, 70%, 80%, 90% or 100% recycled fibers;
(v) comprises OCC recycled fibers comprising 5% native size press starch and starch gel that may be reclaimed for use in the manufacture of paper or board;
(vi) comprises starch derived from recycled fibers and/or mill broke fibers in the starch-containing stock and/or comprises starch that is added to the treated fiber stock; or
(vii) any combination of (i) to (vi).

6. The method of claim 1, wherein:
(i) the method is effected prior to the use of the treated fiber stock in a papermaking process or other industrial process using cationic functional polymers or other papermaking chemicals;
(ii) said synthetic starch trapping polymers A and B are added to said starch-containing fiber stock prior to washing and/or cleaning and/or thickening, wherein said starch-containing fiber stock has a consistency (i.e., percent oven dry mass in the stock) of less than 4%, 2%, or 1%;
(iii) said synthetic starch trapping polymers A and B are added to said starch-containing fiber stock prior to forming and/or pressing and/or drying, wherein said starch-containing fiber stock has a consistency (i.e., percent oven dry mass in the stock) of 15-35%; or
(iv) any combination of (i) to (iii).

7. The method of claim 1, wherein:
said combined dosage of synthetic starch trapping polymers A and B ranges from 0.1-2.72 kg (as is)/ton of produced paper or board;
(ii) said combined dosage of synthetic starch trapping polymers A and B ranges from 0.52-0.87 kg (as is)/ton of produced paper or board;
(iii) said treated fiber stock is used in the manufacture of paper, board or the like; or
(iv) any combination of (i) to (iii).

8. A paper or board obtained by the method according to claim 1.

9. The method of claim 1, wherein said treated fiber stock is used in papermaking or other process using one or more additional cationic polymers, thereby (i) resulting in enhanced efficiency of said additional cationic polymers and/or (ii) facilitating the use of reduced amounts of said additional cationic polymers, wherein said additional cationic polymers comprise functional paper chemicals used in papermaking.

10. The method of claim 1, wherein the method results in one or more of the following:
(i) synergistic or additive increase in starch trapping efficiency;
(ii) enhanced retention of protected starches (both fresh and recycled) for incorporation into paper or board (e.g., on a paper machine) with minimal sheet formation issues;
(iii) improvement in starch retention, drainage, and fixation;
(iv) enhanced retention of colloidal fines;
(v) control or inhibition of the amount of hydrophobic substances such as stickies or flocs in the recycled stock;
(vi) increased starch trapping efficiencies which is not fiber dependent, when added at dosages of over 0.3 Kg/ton;
(vii) reduction of sheet formation issues on paper machines due to over-flocculation of fibers and stickies or flocs formation;
(viii) any combination of (i) to (vii).

11. A starch-containing fiber stock comprising recycled fibers and/or mill broke fibers, which comprises and/or has been treated with synthetic starch trapping polymers A and B according to claim 1.

12. The method of claim 1, wherein said starch-containing fiber stock comprising recycled fibers and/or mill broke fibers comprises:
(i) a starch-containing thin fiber stock;
(ii) a starch-containing thin fiber stock comprising starch-containing process water from pulp, paper, or board production;
(iii) a starch-containing thick fiber stock; or
(iv) a starch-containing thick fiber stock comprising a starch-containing process water from pulp, paper, or board production.

13. The method of claim 1, wherein
(i) said synthetic starch trapping polymer A comprises a quick inversion cationic emulsion polyacrylamide copolymer comprising a standard viscosity (SV) of between 3 to 3.5 cPs; acrylamide; and 17-22 mol %, 19-21 mol %, or 20 mol % of acryloyloxyethyltrimethyl ammonium chloride (Q9); and (ii) said synthetic starch trapping polymer B comprises a quick inversion cationic emulsion polyacrylamide co-polymer comprising a standard viscosity (SV) of between 1.5 to 2.0 cPs; acrylamide; and 30 to 40 mol % of acryloyloxyethyltrimethyl ammonium chloride (Q9).

* * * * *